United States Patent
Leow

(10) Patent No.: US 11,439,131 B2
(45) Date of Patent: Sep. 13, 2022

(54) SYSTEM AND METHOD FOR OFF-SHORE AND IN-SHORE AQUACULTURE USING FLOATING CLOSED CONTAINMENT FARMING AND AMALGAMATED FACILITY

(71) Applicant: AME2 PTE LTD, Singapore (SG)

(72) Inventor: Ban Tat Leow, Singapore (SG)

(73) Assignee: AME2 PTE LTD, Singapore (SG)

( * ) Notice: Subject to any disclaimer, the term of this patent is extended or adjusted under 35 U.S.C. 154(b) by 827 days.

(21) Appl. No.: 16/340,624

(22) PCT Filed: Oct. 2, 2017

(86) PCT No.: PCT/SG2017/050494
§ 371 (c)(1),
(2) Date: Apr. 9, 2019

(87) PCT Pub. No.: WO2018/074976
PCT Pub. Date: Apr. 26, 2018

(65) Prior Publication Data
US 2019/0274289 A1  Sep. 12, 2019

(30) Foreign Application Priority Data
Oct. 19, 2016 (SG) .......................... 10201608768V

(51) Int. Cl.
*A01K 61/65* (2017.01)
*B63B 11/04* (2006.01)
(Continued)

(52) U.S. Cl.
CPC .............. *A01K 61/65* (2017.01); *A01K 61/60* (2017.01); *B63B 11/04* (2013.01); *B63B 21/50* (2013.01);
(Continued)

(58) Field of Classification Search
CPC ........ A01K 61/65; A01K 61/60; B63B 11/04; B63B 21/50; B63B 35/44; B63J 4/006
See application file for complete search history.

(56) References Cited

U.S. PATENT DOCUMENTS

| 4,257,350 A | * | 3/1981 | Streichenberger | ..... A01K 61/60 |
| | | | | 119/223 |
| 4,798,169 A | * | 1/1989 | Rosen | .................... A01K 61/60 |
| | | | | 119/223 |

(Continued)

FOREIGN PATENT DOCUMENTS

| EP | 0311879 A1 | 4/1989 |
| WO | 1999041976 A2 | 8/1999 |
| WO | 2015173838 A1 | 11/2015 |

OTHER PUBLICATIONS

Dec. 22, 2017—International Search Report and Written Opinion—PCT/SG2017/050494.

(Continued)

*Primary Examiner* — S. Joseph Morano
*Assistant Examiner* — Jovon E Hayes
(74) *Attorney, Agent, or Firm* — Banner & Witcoff, Ltd.

(57) ABSTRACT

An aquaculture production and/or transfer system is provided and comprises: at least one floating aquaculture production apparatus on a novel offshore advanced hull system of varying shapes for closed containment method and ecological friendly for sustainable floating farming system (which may be marketed under Eco-Ark™); a station keeping apparatus coupled to the aquaculture production apparatus; a custodian transfer apparatus having a custodian chamber, a chute and a pump, wherein the custodian chamber is fluidly coupled to at least one of the tanks to receive live aquatic animals therefrom, wherein the chute is configured to transfer live aquatic animals to an amalgamated facility.

39 Claims, 35 Drawing Sheets

(51) Int. Cl.
*B63B 21/50* (2006.01)
*B63B 35/44* (2006.01)
*B63J 4/00* (2006.01)
*A01K 61/60* (2017.01)

(52) U.S. Cl.
CPC .............. *B63B 35/44* (2013.01); *B63J 4/006* (2013.01); *B63B 2035/4493* (2013.01); *Y02A 40/81* (2018.01)

(56) References Cited

U.S. PATENT DOCUMENTS

| | | | | |
|---|---|---|---|---|
| 4,930,444 | A * | 6/1990 | Vasile .................... | A01K 61/60 |
| | | | | 114/321 |
| 5,713,303 | A * | 2/1998 | Willinsky .............. | A01K 61/17 |
| | | | | 119/223 |
| 5,762,024 | A * | 6/1998 | Meilahn ................ | A01K 61/60 |
| | | | | 119/211 |
| 10,945,417 | B2 * | 3/2021 | Odlin ...................... | B63B 35/00 |
| 2011/0092726 | A1 * | 4/2011 | Clarke ................... | C12M 29/06 |
| | | | | 435/257.1 |

OTHER PUBLICATIONS

Sep. 12, 2018—International Preliminary Report on Patentability—PCT/SG2017/050494.

* cited by examiner

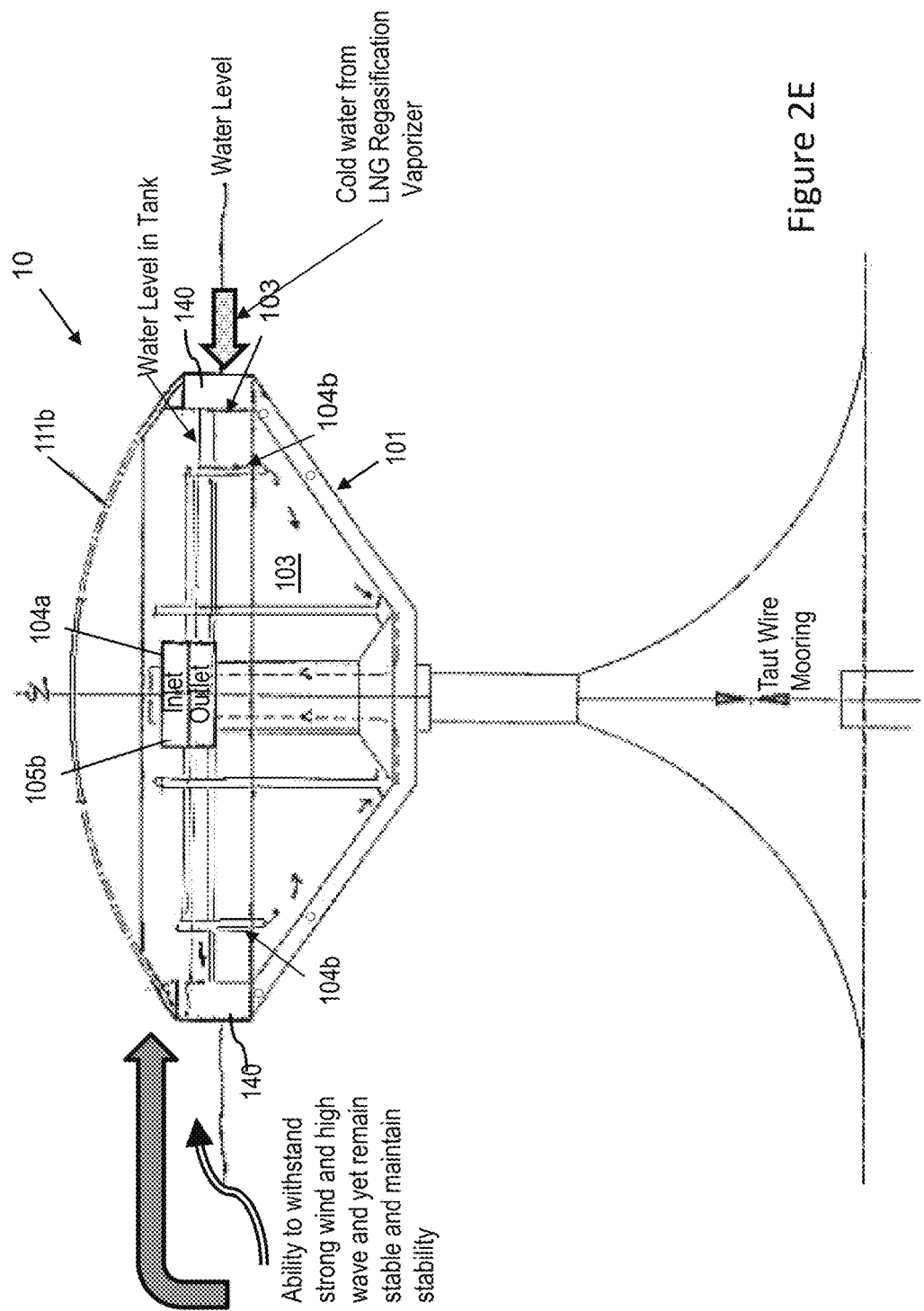

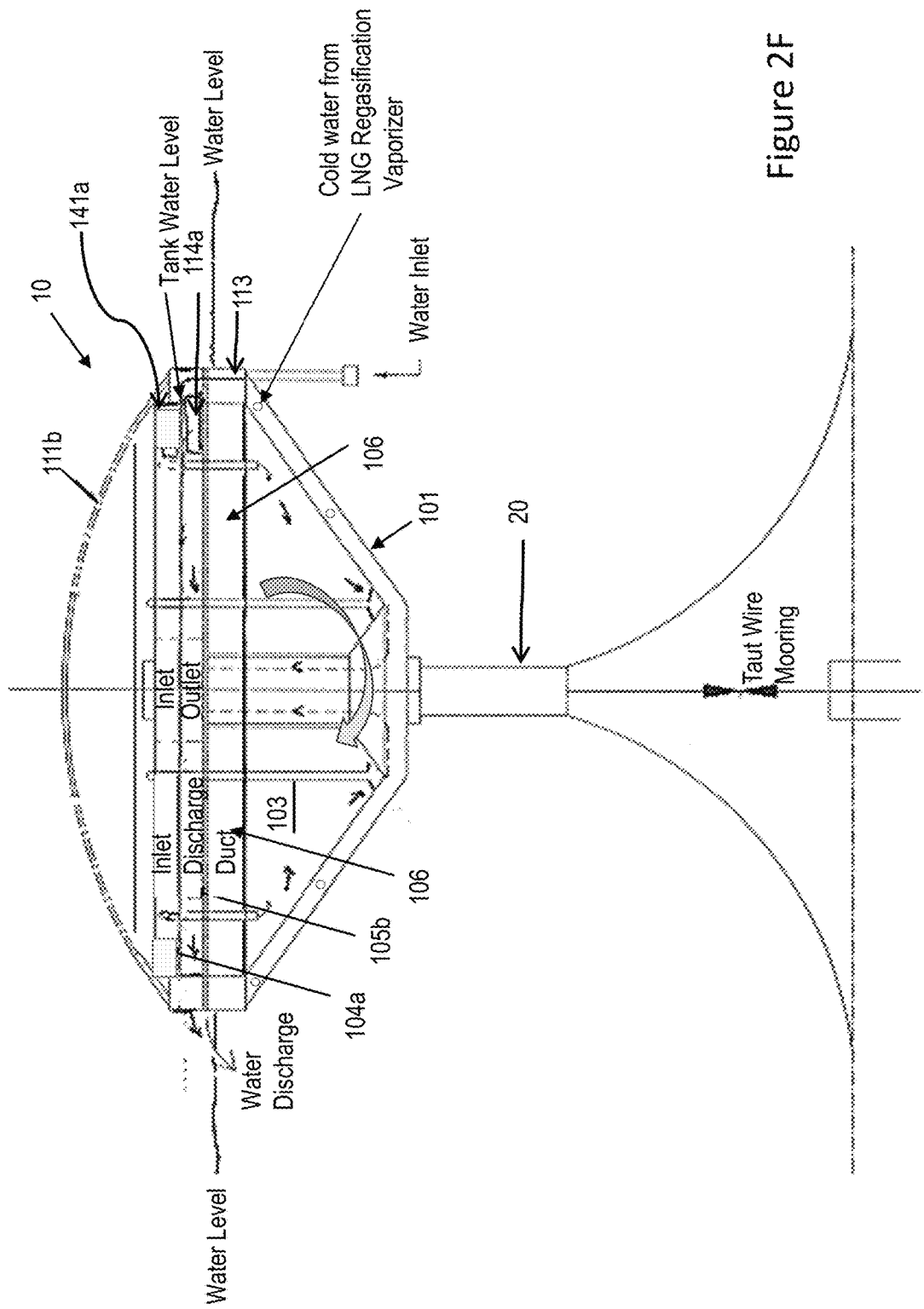

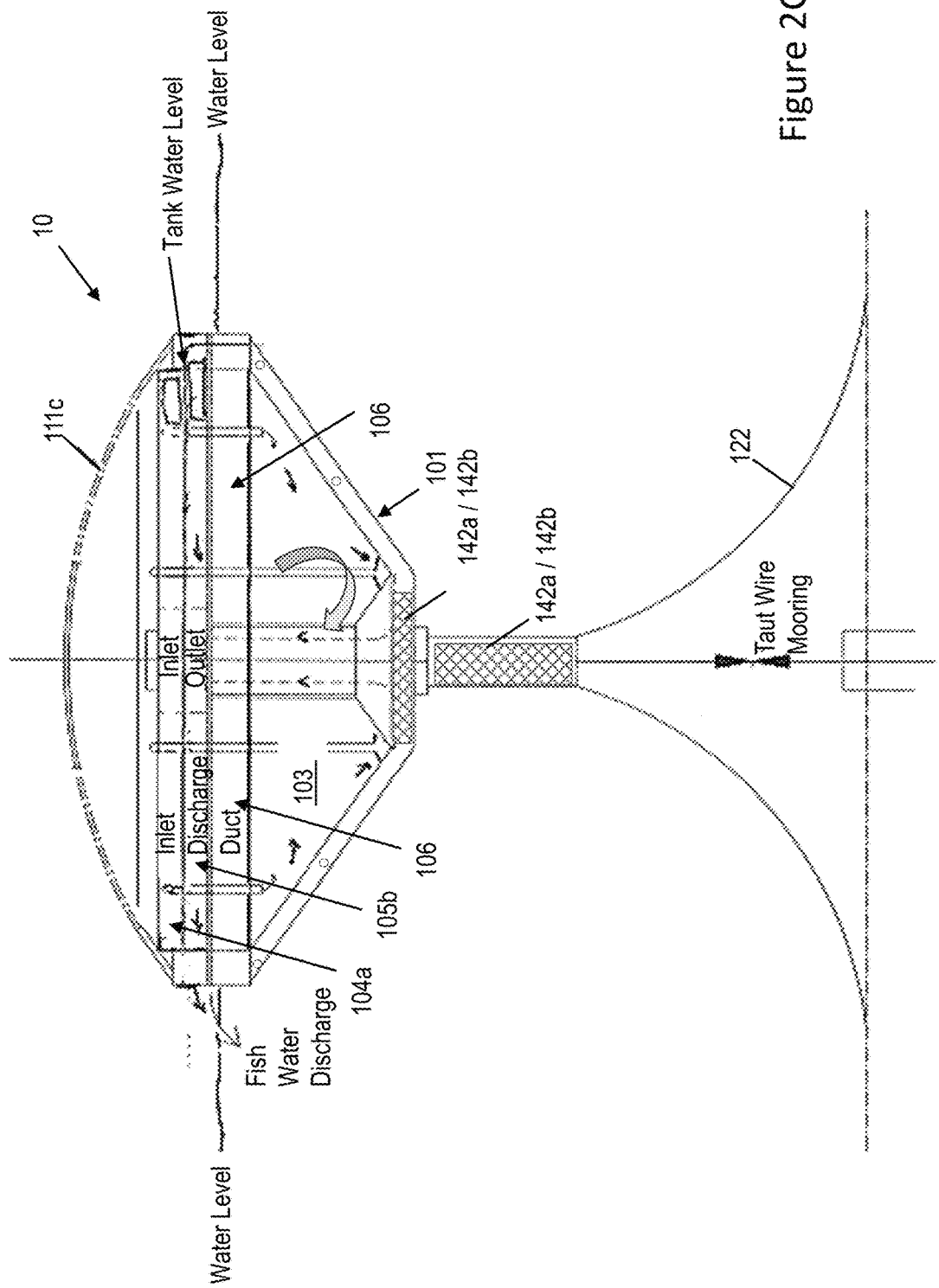

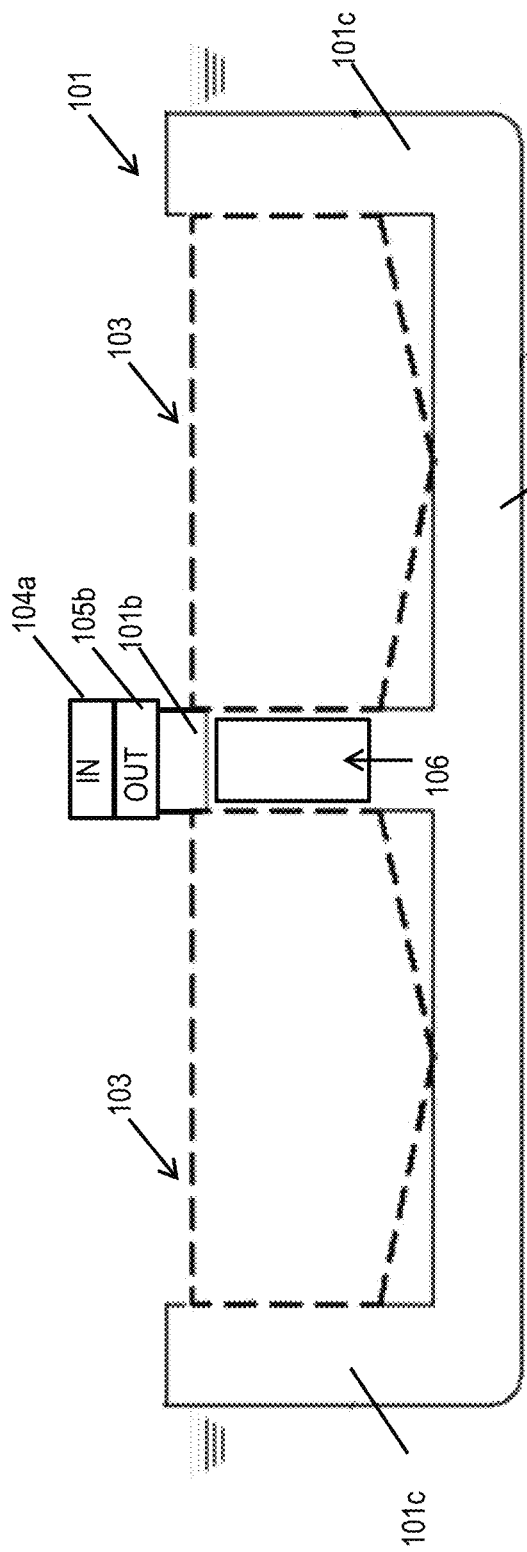
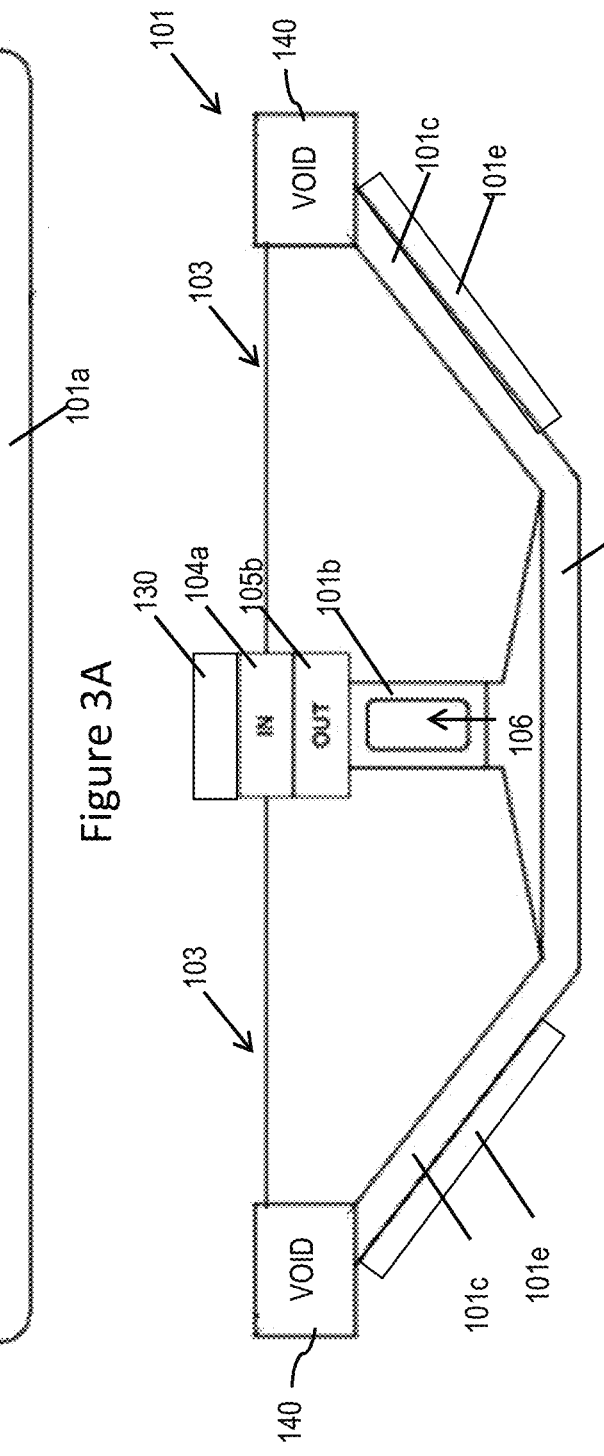
Figure 3A
Figure 3B

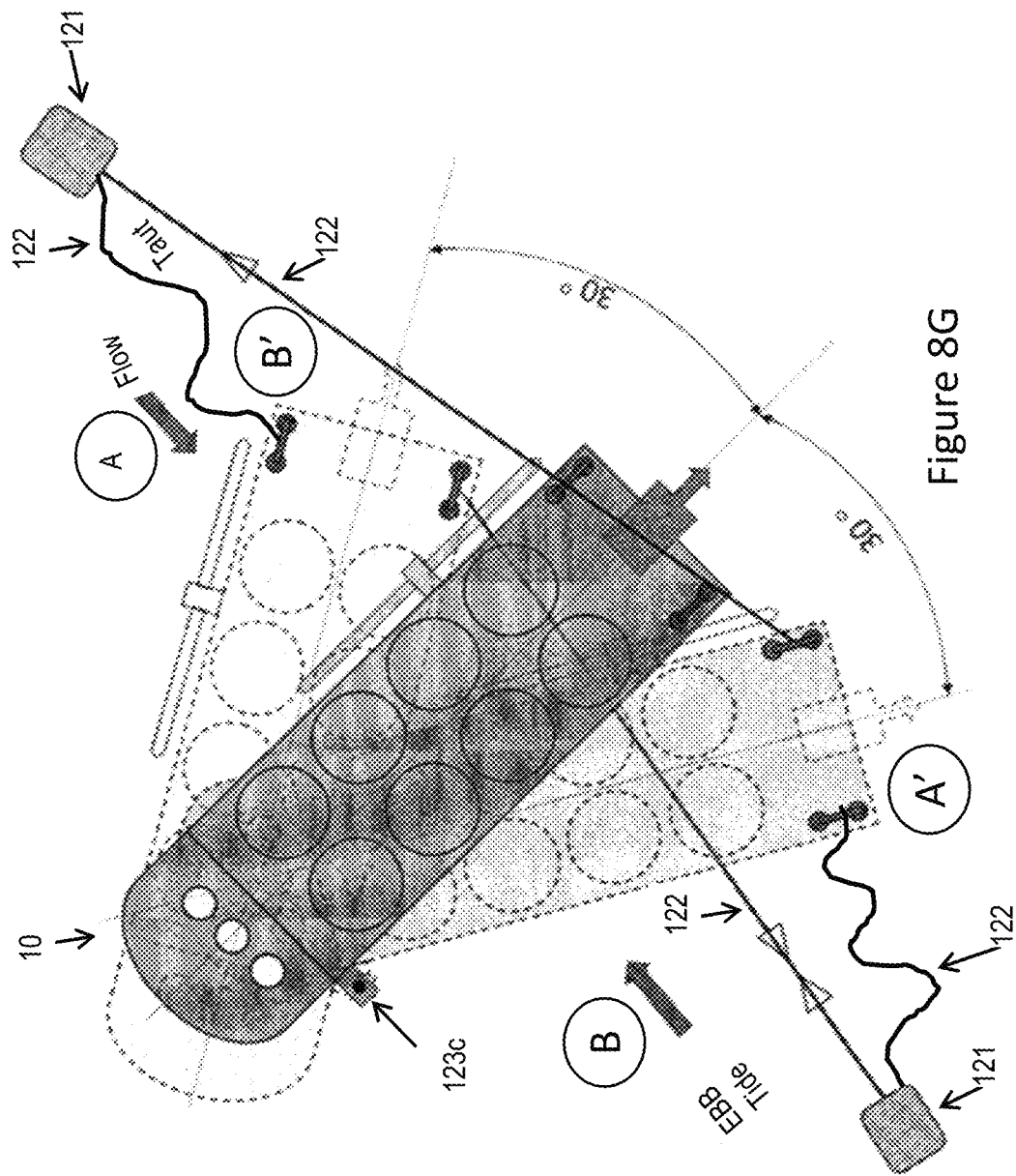

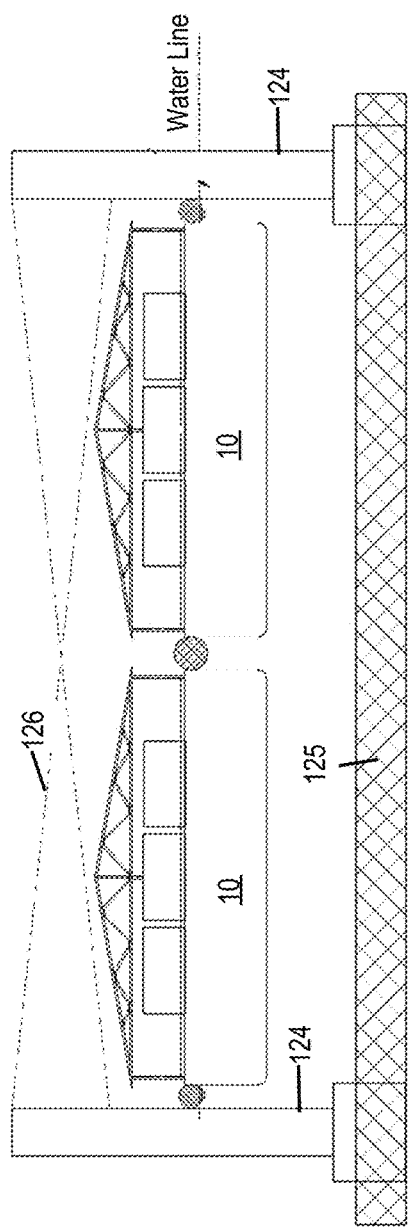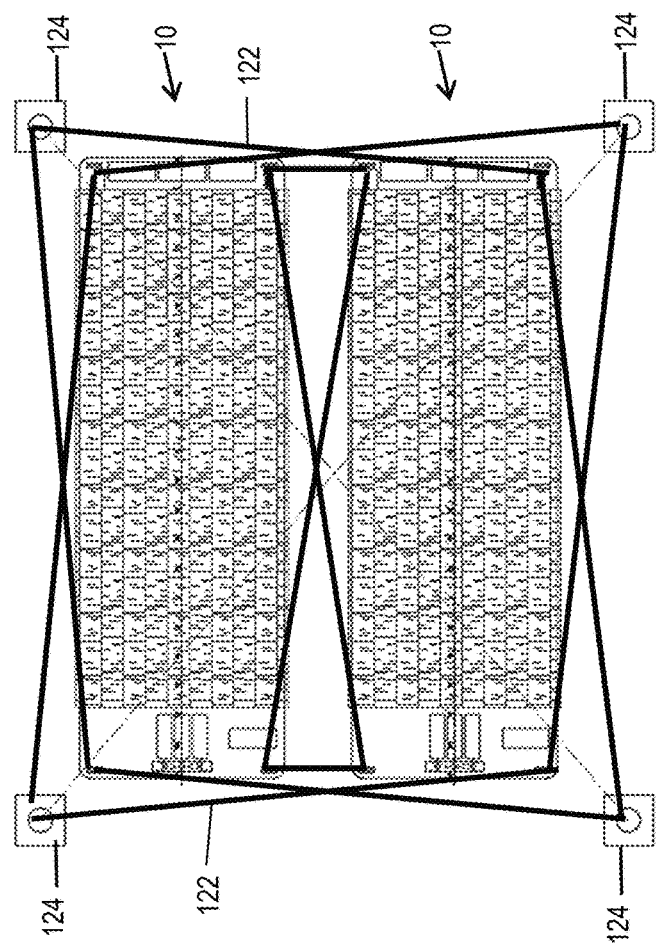

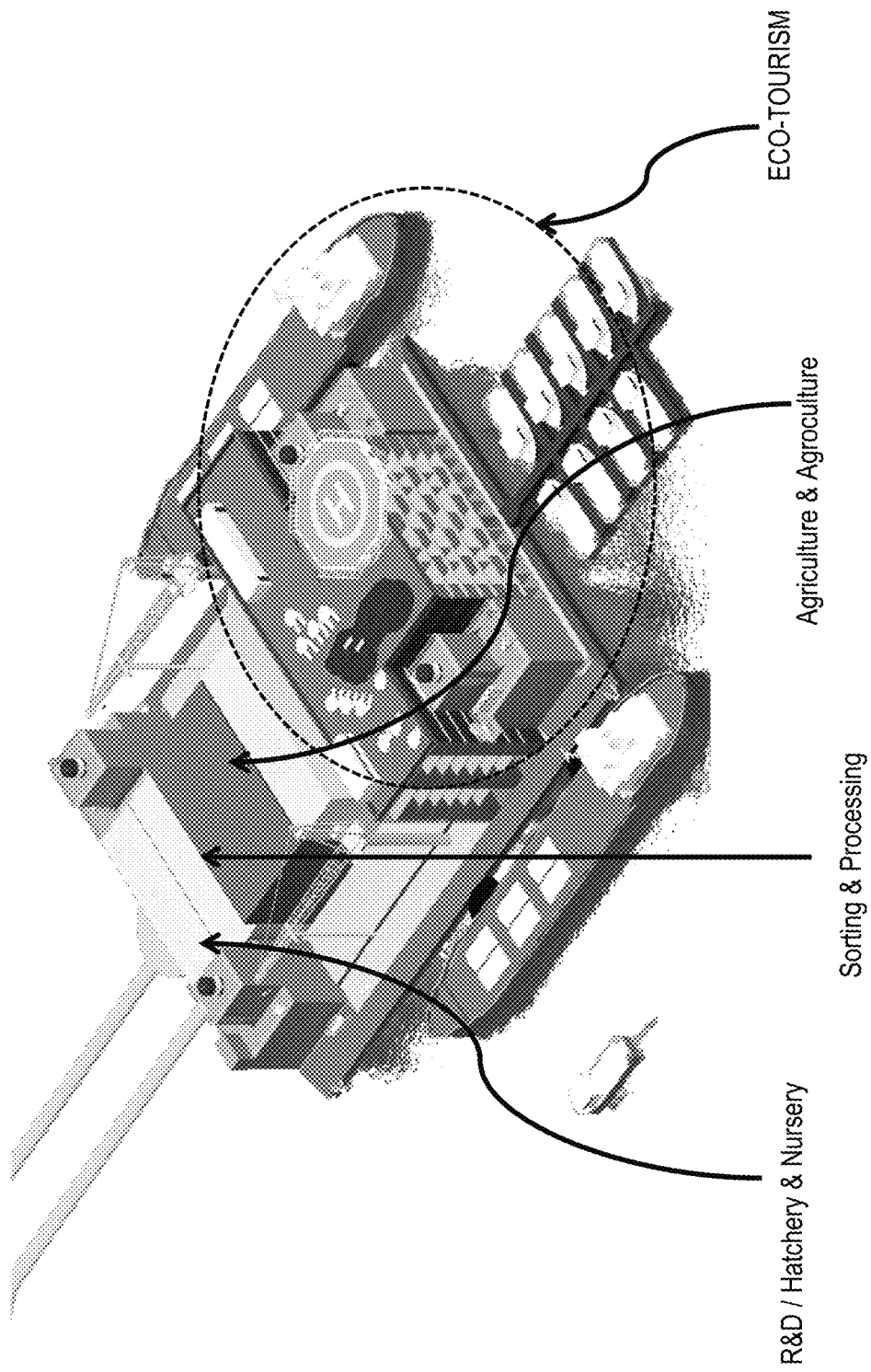

SYSTEM AND METHOD FOR OFF-SHORE AND IN-SHORE AQUACULTURE USING FLOATING CLOSED CONTAINMENT FARMING AND AMALGAMATED FACILITY

CROSS-REFERENCE TO RELATED APPLICATIONS

This application is a U.S. National Stage entry of International Patent Application No. PCT/SG2017/050494, filed Oct. 2, 2017, which claims priority to Singaporean Patent App. No. 10201608768V, filed Oct. 19, 2016, the contents of which are incorporated herein by reference in their entirety.

FIELD

Embodiments of the invention relate to off-shore sea water and in-shore, on-shore fresh water lakes, rivers and other embodied water for aquaculture production and/or transfer systems and methods thereof.

BACKGROUND

Aquaculture refers to farming of aquatic animals such as fish, shellfish and cultivation of plants in water. The term aquaculture refers to the cultivation of both marine and freshwater species. Such cultivation may be on land, in inland ponds or raised tanks, or in open sea or ocean using net cages.

Off-shore, near and in-shore aquaculture can result in environmental damage due to inappropriate waste handling, potential introduction of invasive species or foreign pathogens, and high energy requirements. Besides, in most countries, near shore land is in scarcity.

Off-shore and near shore open sea aquaculture and in land-locked country with large lakes, both sea water and fresh water, are alternatives to inland aquaculture and are predicted to increase in the future due to lack of land space and lower environmental damage as compared to inland aquaculture.

However, open sea or ocean aquaculture using net-cages/pens and adapting technologies of offshore and marine industry to improve the level of automation has its limitations, production risks and higher production cost from utilising more floating assets. For example, such aquaculture (normally with open nets or cages) results in direct contact of the cultivated aquaculture, e.g. farmed fish, with sea water and exposure to waste, chemical, pollutants and parasites subsisting in the sea water. This leads to diseased farm bred fish. Escaped farmed fish may spread disease to wild fish resulting in poor sustainability. Farmed fish in nets may also attract predators. Pollution of the site from fish waste and remaining fish meal may lead to phytoplankton/algae blooms. Furthermore, these nets require regular inspection, maintenance and cleaning to enable adequate sea water flow into the nets. The above drawbacks have not accounted for changes in weather, water quality and water temperature, depletion of oxygen and pollution caused by maritime traffic, all of which would decimate open sea fish farming.

In summary, besides potential losses and death to the fish from algae bloom, the major concerns are the environmental impacts from off-shore farms, including fish waste, excess fish feed, antibiotic use, the potential for fish escapes and the spread of disease to wild fish populations and etc. Many of these same points have been contentious in conventional fish farming in near-shore, shallow environments, and in some cases with disastrous consequences. In view of the above and others, namely the concern of environmental issues, there is a need to develop sustainable farming methods. An improved system and method for offshore and on-lake freshwater aquaculture and/or agriculture is highly desired to overcome all the above and other concerns. The future will be on sustainability farming and ensuring the natural environment is protected. While long-term sustainable fish farming is important, top priority should also be given to design and considerations to (1) the environment, (2) community and social impact and (3) economical production advantage to ensure commercial viability.

One object of the present invention is therefore to address the problems of the existing art and/or to provide a choice that is useful in the art.

SUMMARY

The invention is capable of significantly increasing aquaculture production yield over other existing methods so as to provide food security at lower cost to all, yet safeguarding the environment, society and community, and achieving an economic advantage.

(1) Environment—the invention is capable of supplying any community with endangered fish species which are becoming extinct from over-fishing and climate changes. The invention provides an eco-friendly design and uses green energy without polluting the environment, as there is no pumping out or discharging of massive fish waste to open sea/ocean. Its design is based on reduction of energy and use of low-energy, and reduction of carbon foot-print, and yet achieves high productivity with high density intensified fish farming to bring food security to the community and above all using smaller space.

(2) Social—the invention provides long term employment to the community and trains the fishermen to become fish farmers. In fish catching, yield of catch is uncertain and unpredictable due to depletion of wild fish population whereas with the invention, yield of food fish production is more certain and predictable under a controlled environment. In the longer term, the invention would attract more young talents to be fish farmers instead of fishermen with the use of technology and better living condition on-board. Accordingly, the invention has capability to feed the community with food fish protein at affordable price for maintenance of good health, and supply to the community with fish species in high demand especially those that are becoming endangered in the wild. According to the invention, an aquaculture production apparatus, which may be commercially marketed under the name of Eco-Ark™, is movable and mobile such that it can be towed away from site and re-deployable from site to another site. Furthermore, one vision of the invention is to be able to populate the fish farm and re-populate the open ocean with healthy endangered species of fish-fingerlings. For every farmed fish, one farmed fish may be returned back to the open sea and, in this manner, the world would then have farmed fish from Eco-Ark™ and yet the world's wild fish will be populated.

Furthermore, another vision of the invention is to be able to populate the fish farm and re-populate the open ocean with healthy endangered species of fish-fingerlings. For every farmed fish, one healthy farmed fingerling can be returned back to the open sea and, in this manner, the world would have sustainable farmed fish from Eco-Ark™ and yet the world's wild fish population will be re-populated.

(3) Economics—The Novel Offshore Advanced Hull (NOAH) system of the invention provides high buoyancy and is able to hold one or multiple cultivation or fish tanks.

This invention being a new advanced hull technology is able to provide large volume tanks in a closed containment method and yet its design is able to provide an option of flow through and/or recirculation system depending on site and needs. In any case, the waste and sediment of the fish water is siphoned out from the bottom without the use of electrical energy and pump. The design respects Mother Nature by using the gravitational force to allow the fish waste to be siphoned at the bottom and top to be discharged to the discharge channel of the apparatus. This apparatus thus consumes low energy for high production in this closed containment floating fish farm method. This apparatus therefor eliminates the various environmental problems and issues by not having fish production in open water together with other wild fish.

With a closed cage apparatus as a closed containment fish farming (CCFF) method provided by the invention, all pollution will be reduced, no fish can escape, no transfer of disease and parasite to the wild will take place. This invention with closed containment is capable of lasting more than 10 years without the need for docking the Eco-Ark™, whereas existing open net methods may not last that long. This invention also runs at minimum operation costs due to less labour, less fish meal losses, less energy, less cleaning cost, no concern for algae bloom, oil pollution and water temperature changes and hence results in reduced costs as compared to existing open net cage farming methods.

The economic advantage comes from three aspects, representing 3Rs of an eco-friendly designed ark/aquaculture production apparatus which may be commercially marketed under the name of Eco-Ark™. Its economic advantage comes from (i) Reuse, (ii) Reduce, (iii) Recycle to protect the environment. This will be demonstrated throughout this description. The design philosophy of the Eco-Ark™ is to ensure that the investment cost by way of fish production per kilogram per annum must be competitive to the existing methods. The cost of Eco-Ark™ after prototype may be reduced by recycled steel plate and operation cost, e.g. cost of energy, may be reduced using green renewable energy from the solar energy as the base to power production of hydrogen and uses hydrogen fuel cell technology amongst others to provide electricity. In view of the above, the invention aims to be ecologically friendly and socially responsible, respect the natural environment or nature, bring back nature, and use nature to solve our modern day's problems and issues as the world population increases year-on-year.

According to a first aspect of the invention, a floatable closed containment aquaculture production apparatus is provided and comprises:
 a novel offshore advanced hull system having a bottom portion, opposed outer side portions extended therefrom, and a centre portion arranged between the outer side portions and extending from the bottom portion to increase strength of the hull and define at least one recess between the centre portion and the outer side portions, wherein at least the bottom portion and the outer side portions include at least one ballast water space therein;
 at least one closed containment aquaculture cultivation tank arranged in the recess,
 wherein the centre portion and the outer side portions are provided with void spaces configured to allow the hull, together with the at least one cultivation tank, remain semi-submerged in water when the hull is arranged in a body of water.

According to a second aspect of the invention, an aquaculture production and transfer system is provided and comprises:
 at least one floatable closed containment aquaculture production apparatus of the first aspect of the invention;
 a station keeping apparatus coupled to the at least one floatable closed containment aquaculture production apparatus;
 a custodian transfer apparatus having a custodian chamber, a chute having an inlet fluidly coupled to the custodian chamber and an outlet, and at least one pump arranged at the chute, wherein the custodian chamber is configured to be fluidly coupled to at least one of the tank discharge pipes to receive aquatic animals therefrom, wherein the pump is configured to draw a flow of water through chute such that the aquatic animals are transported towards the outlet of the chute by the flow of water.

According to a third aspect of the invention, an aquaculture production and transfer method is provided and comprises:
 cultivating aquaculture in at least one floatable closed containment aquaculture production apparatus of any the first aspect of the invention, which is arranged in the body of water;
 transferring aquatic animals from the floatable closed containment aquaculture production apparatus through one of the tank discharge pipes to a custodian transfer chamber; and
 transporting the aquatic animals through an inlet and an outlet of the chute by drawing a flow of water through the chute, wherein the inlet of the chute is fluidly coupled to the custodian transfer chamber.

BRIEF DESCRIPTION OF THE DRAWINGS

Embodiments of the invention are disclosed hereinafter with reference to the drawings, in which:

FIG. 2E is a side cross-sectional view of the circular-shaped aquaculture production apparatus taken along line B-B of FIG. 2D the side elevation has a bowl shape;

FIG. 2F is a side cross-sectional view of the circular shaped aquaculture production apparatus taken along line A-A and has a bowl shaped of FIG. 2D;

FIG. 2G is a side cross-section view of the circular shaped aquaculture production apparatus having a watertight cover for provide submergibility capability;

FIG. 3A is a schematic cross-sectional view taken at a mid-ship section of a hull of one illustrative aquaculture production apparatus which is arranged in a body of water in an operative position;

FIG. 3B is a schematic cross-sectional view taken at a mid-ship section of a hull of another illustrative aquaculture production apparatus, similar to FIG. 1C, which is arranged in a body of water in an operative position;

FIG. 4E is a partial side view of FIG. 4D;

FIG. 8G is a plan view of single or double side columnar spud pipe with one of the spud pipe spudded on the aquaculture production apparatus of FIG. 8A;

FIG. 8H is front sectional view of two and more aquaculture production apparatuses of FIG. 8A moored to matted gravity concrete base to withstand harsh weather condition to maintain safe mooring of the apparatus;

FIG. 8I is a plan view of FIG. 8H;

FIG. 17 shows a perspective view of an amalgamated facility having berthing facility, vertical agriculture, research and development (R&D) hatchery, fish processing facility, and eco-tourism and marina all housed within the amalgamated facility.

DETAILED DESCRIPTION

Figure 1A:
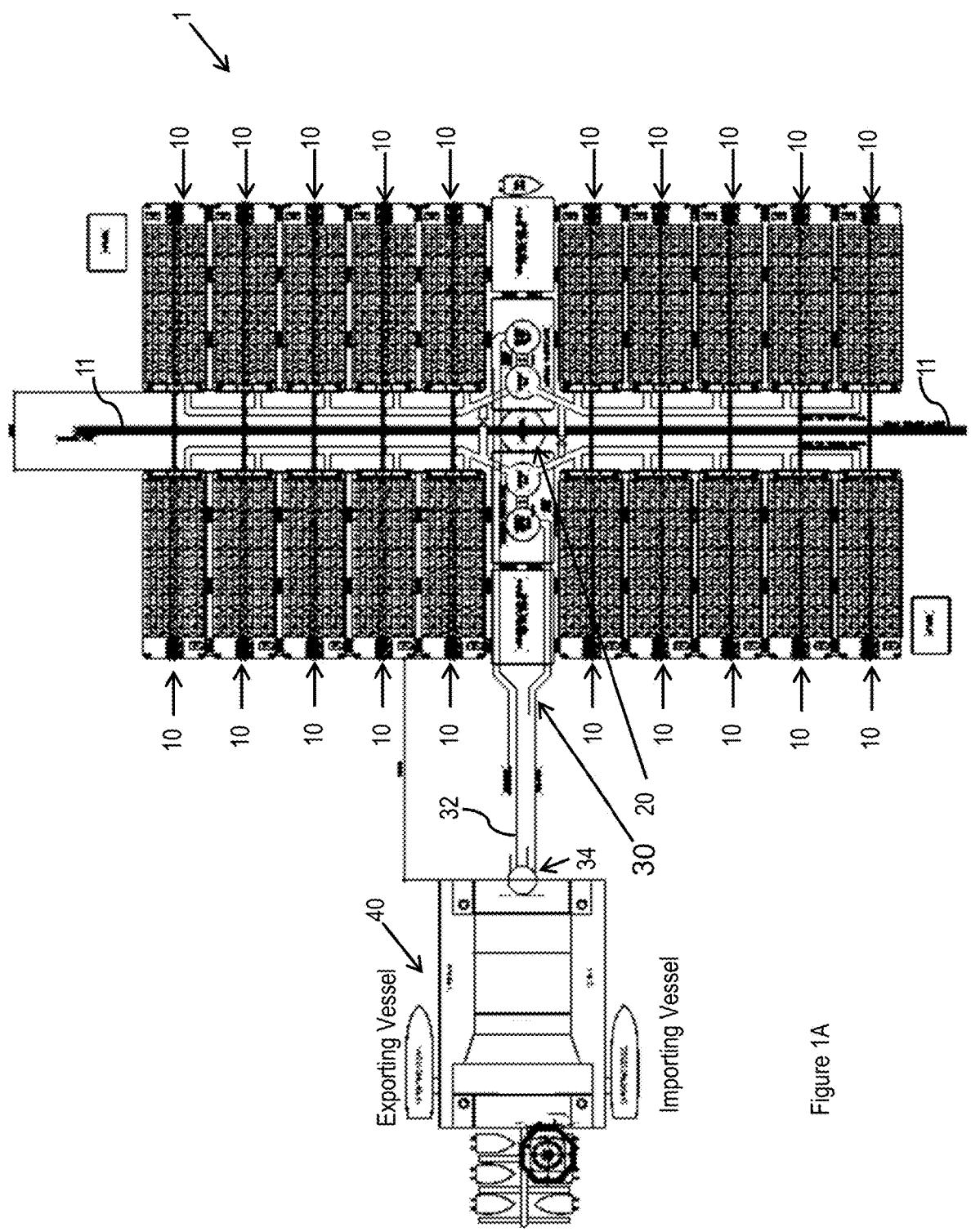
FIG. 1A shows an aquaculture production and transfer system according to one embodiment of the invention, wherein the system comprises multiple units of aquaculture production apparatus or Eco-Ark™.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

Embodiments described in the context of one of the methods or devices or systems are analogously valid for the other methods or devices or systems. Similarly, embodiments described in the context of a method are analogously valid for a system or device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements As used herein, the term "and/or" includes any and all combinations of one or more of the associated listed items.

As used herein, the term "each other" denotes a reciprocal relation between two or more objects, depending on the number of objects involved.

As used herein, the term "coupled" and related terms are used in an operational sense and are not necessarily limited to a direct physical connection or coupling. Thus, for example, two devices may be coupled directly, or via one or more intermediary devices. As another example, devices may be coupled in such a way that fluids may be passed there between without sharing physical connection with each other. Based on the present disclosure, a person of ordinary skill in the art will appreciate a variety of ways in which coupling exists in accordance with the aforementioned definition.

As used herein, the terms "first," "second," and "third," etc. are used merely as labels, and are not intended to impose numerical requirements on their objects.

As used herein, the terms "configured to" includes references to "adapted to", and "constructed and arranged to".

As used herein, the term "pipe" includes a reference to a rigid pipe or a flexible pipe or a combination thereof to provide a conduit for fluid flow, or any types of conduit and channel.

As used herein, the terms "body of water" and "water body" refer to marine waters, e.g. sea, ocean, and to inland fresh or salt waters, e.g. lakes, reservoirs, rivers.

As used herein, the term "aquaculture" refers to cultivation or farming of aquatic animals and/or plants in natural or controlled, and marine or freshwater environments primarily for human consumption or use, and may further refer to aquatic animals, e.g. fish, shellfish, crustaceans, other aquatic (marine or freshwater) organisms.

Figure 1B:
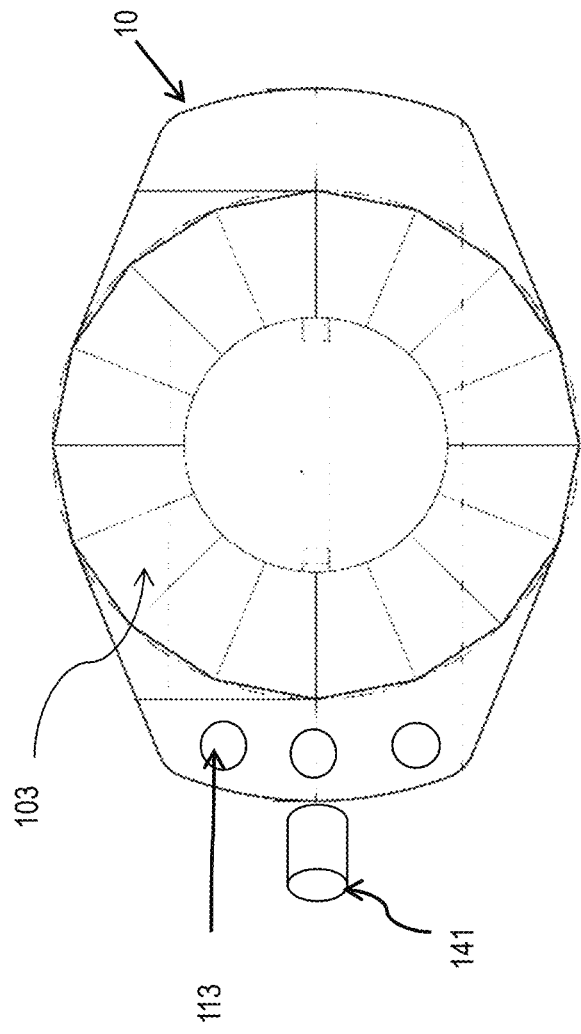
FIG. 1B shows a plan view of an aquaculture production apparatus according to one embodiment of the invention, wherein the aquaculture production apparatus has a hexadecagonal-shaped plan profile.
Figure 1C:
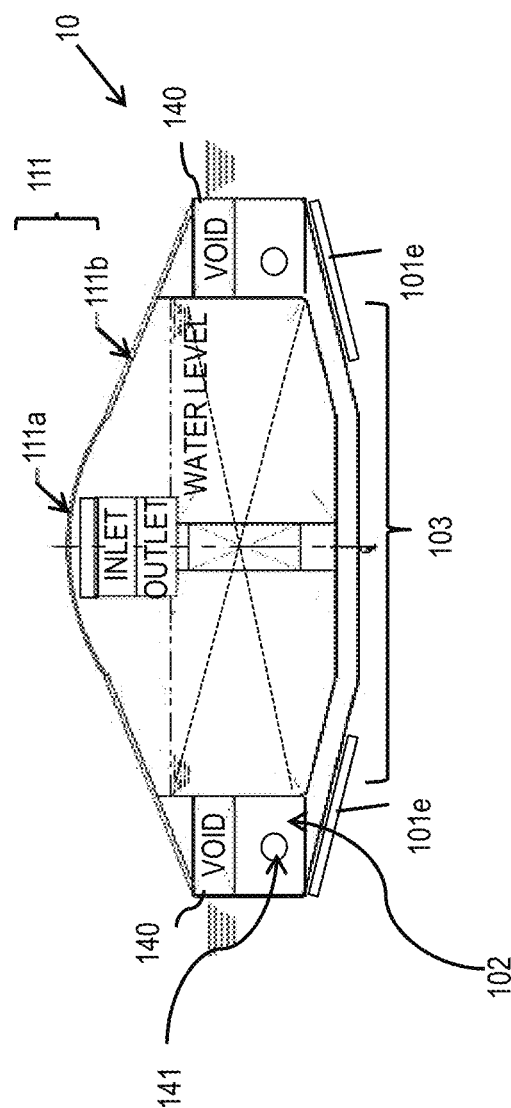
FIG. 1C is a sectional view of the aquaculture production apparatus having a disc-shape from the side view of FIG. 1B.
Figures 1D, 1E:
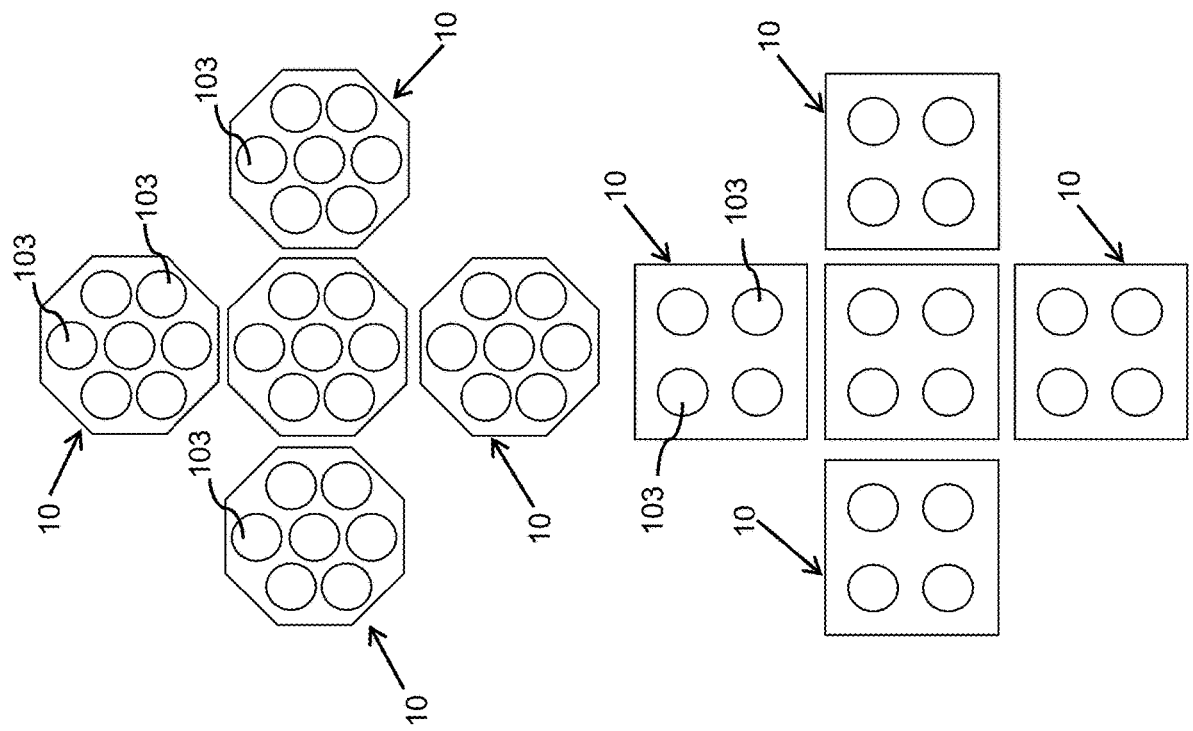
FIG. 1D is a plan view of one illustrative arrangement comprising multiple units of octagonal-shaped aquaculture production apparatus.
FIG. 1E is a plan view of one illustrative star-shaped arrangement comprising multiple square-shaped aquaculture production apparatus.
Figure 1G:
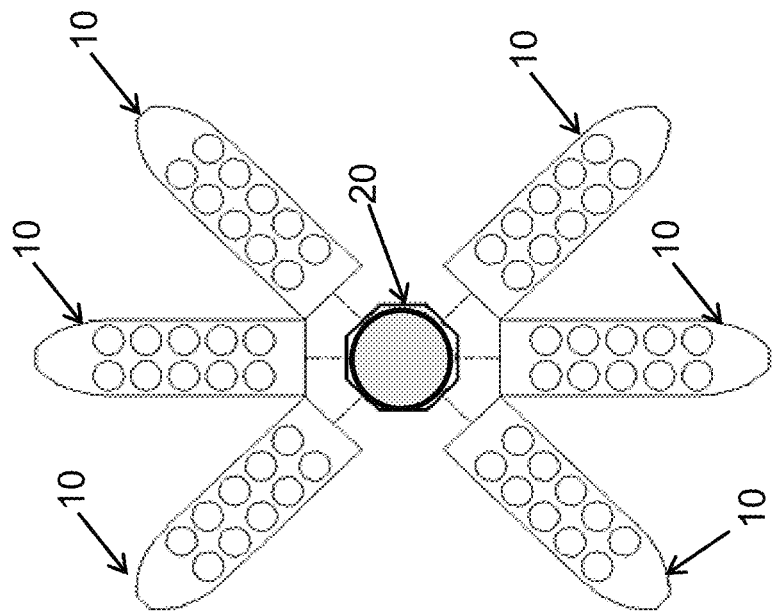
FIG. 1G is a plan view of one illustrative star-shaped arrangement comprising multiple rectangular-shaped aquaculture production apparatus, wherein each apparatus is coupled to a station keeping apparatus.
Figure 1F:
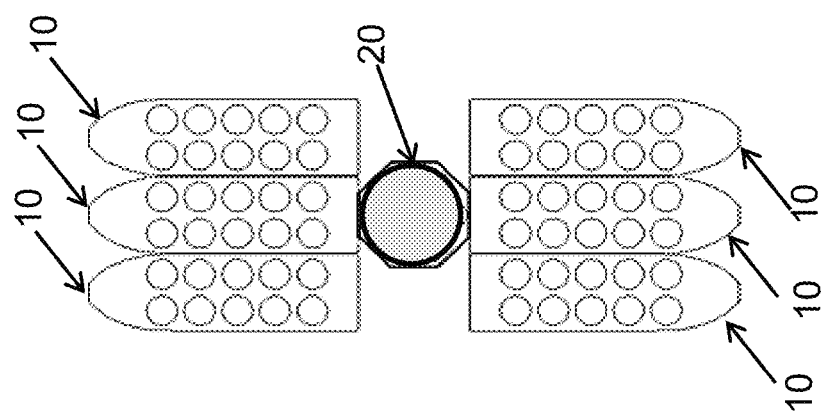
FIG. 1F is a plan view of one illustrative arrangement comprising multiple rectangular-shaped aquaculture production apparatus arranged two straight rows wherein each row is coupled to a station keeping apparatus.
Figure 1H:
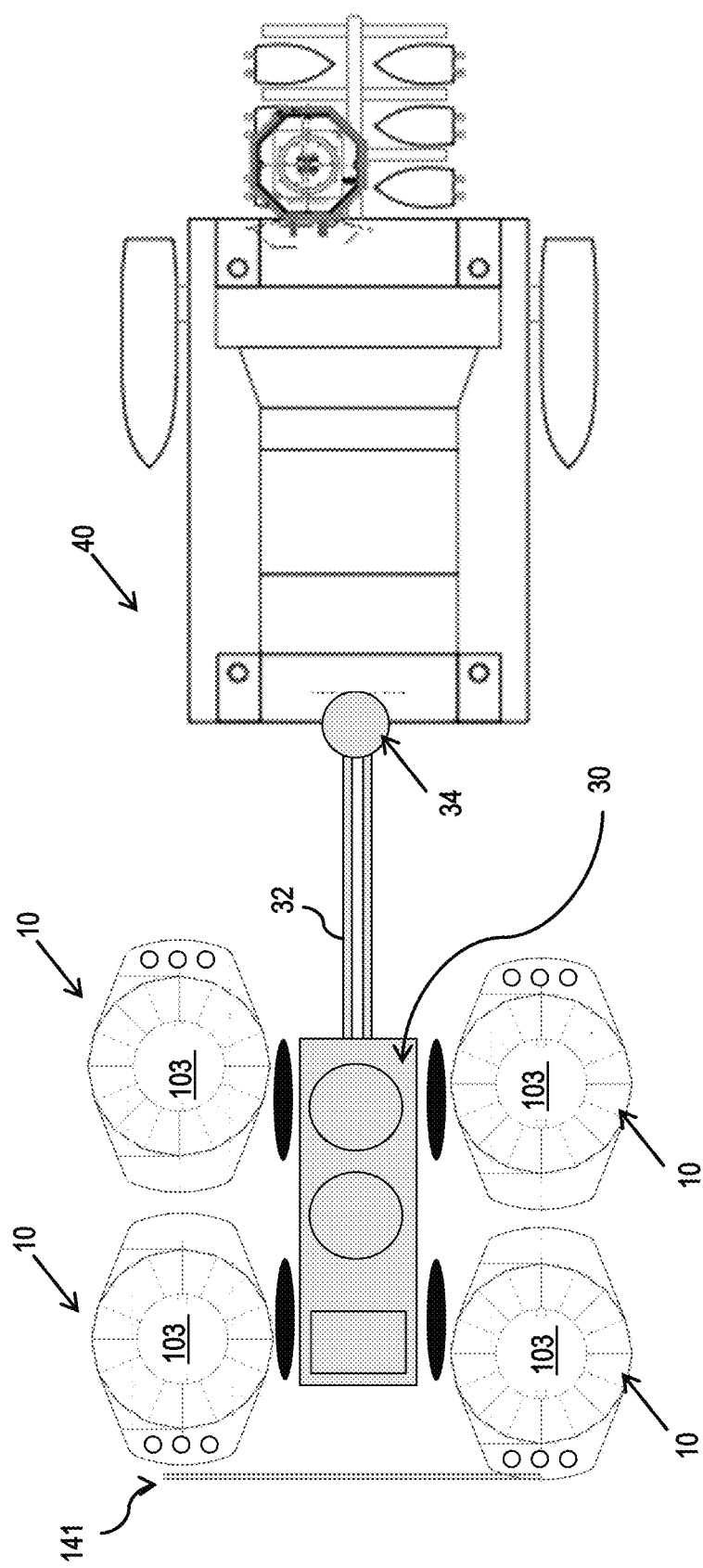
FIG. 1H is a plan view of an aquaculture production and transfer system according to one embodiment of the invention, wherein the system comprises four units of hexadecagonal-shaped aquaculture production apparatus.

According to one aspect of the invention, an aquaculture production and transfer system 1 is provided (see FIGS. 1A and 1H). The system 1 comprises a plurality of floatable closed containment aquaculture production apparatuses 10 configured to cultivate or farm aquatic animals, a station keeping apparatus 20 coupled to at least one of the production apparatuses 10, a custodian transfer apparatus 30 configured to receive aquatic animals from various aquaculture production apparatuses 10 or farms and further configured to transport live aquatic animals to an amalgamated facility 40 which is separated from the aquaculture production apparatuses 10 by a body of water. In one embodiment, the amalgamated facility 40 may be located around 100 metres from the aquaculture production apparatuses 10.

The aquaculture production and transfer system 1 is arranged in any body of water of sufficient depth. For example, the system 1 may be arranged in marine waters, e.g. offshore in sea and ocean, or fresh or salt waters, e.g. lakes and rivers. The apparatus 10 may be configured to be floatable or floating. The apparatus 10 may be movable, e.g. by towing or self-propulsion. In operation, the apparatus 10 may be heavily submerged and, in some embodiments, mostly or substantially or almost submerged, e.g. in some embodiments, a depth of the hull 101, which is defined by the outer side portions 101c and the bottom portion 101a, is at least 90% submerged under water surface. This will result in low free-board such that the energy used to pump the high volume fish production water to the apparatus 10 and subsequently deliver through the inlet channel 104a to be dropped into the cultivation tank/tanks 103, is thus at low delivery discharge head of water inlet pump 113. With such low delivery head, the electrical energy required by the water inlet pump 113 is very much reduced and low, by so doing, saves energy cost.

Various shapes of the aquaculture production apparatuses 10 may be envisaged in different embodiments, e.g. a top plan profile is a rectangle (FIG. 1A), octagon (FIG. 1D), square (FIG. 1E), hexagon (FIG. 1H), any other polygon or non-polygon; the entire apparatus 10 may be disc-shaped, bowl-shaped or ark-shaped. In different embodiments, the number of aquaculture production apparatuses 10 may range from one standalone apparatus or multiple apparatuses. Various arrangements of aquaculture production apparatuses 10 may be envisaged in different embodiments, e.g. FIG. 1A shows multiple aquaculture production apparatuses 10 arranged in rows and columns, FIG. 1F shows multiple aquaculture production apparatuses 10 arranged in two rows and coupled to a station keeping apparatus 20 located between the rows, FIG. 1G shows multiple aquaculture production apparatuses 10 in a star arrangement coupled to a station keeping apparatus 20 between the rows.

Figure 2A:
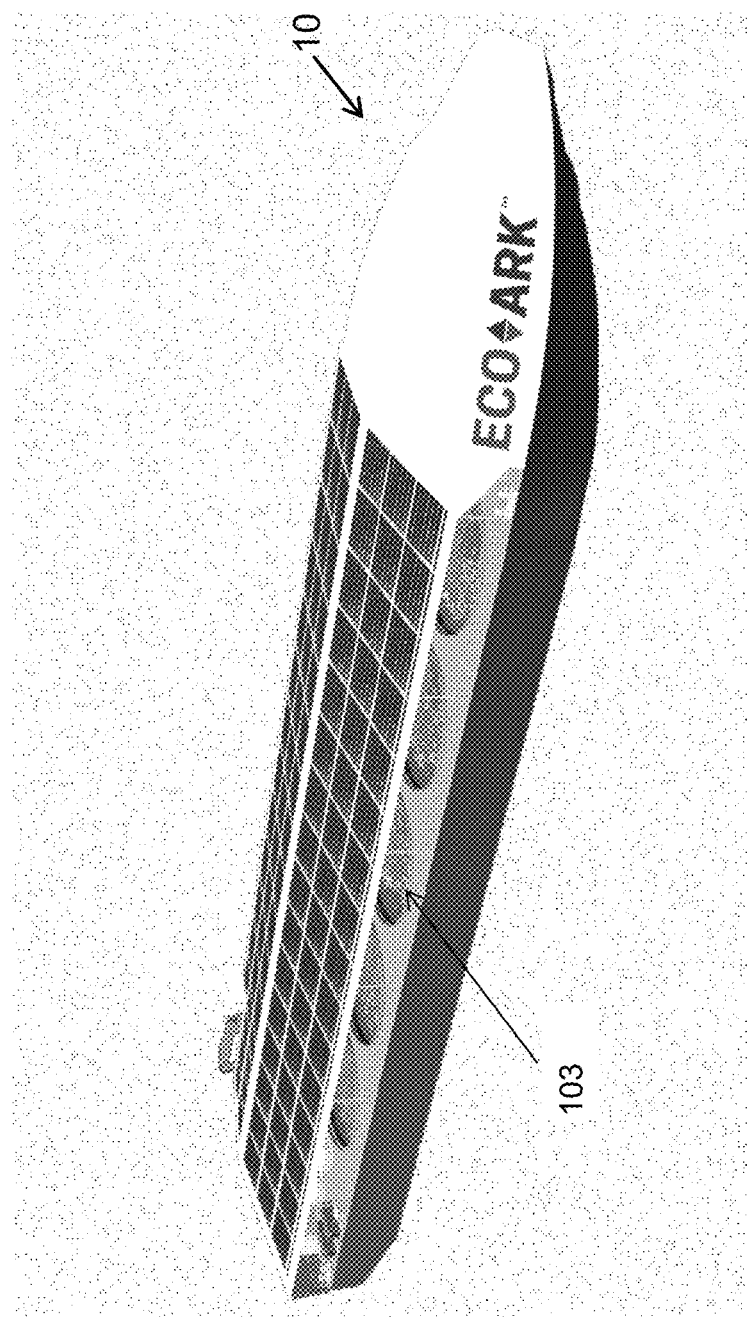
FIG. 2A is a perspective view of one of the various shape of the aquaculture production apparatus or Eco-Ark™ according to one embodiment of the invention, wherein the aquaculture production apparatus is rectangular-shaped; namely this inventive apparatus is different from other closed-containment floating fish farm in that it has high buoyancy floatation capacity and capability by way of its innovative novel offshore advance hull concept; that it is designed to be self-contained by way of electricity power, oxygen generator, storage for fish food and its automatic feeding system and accommodation and laboratory for fish farmers while other method will have to depend on external power source, accommodation and external fish food supply barge etc.
Figure 2B:
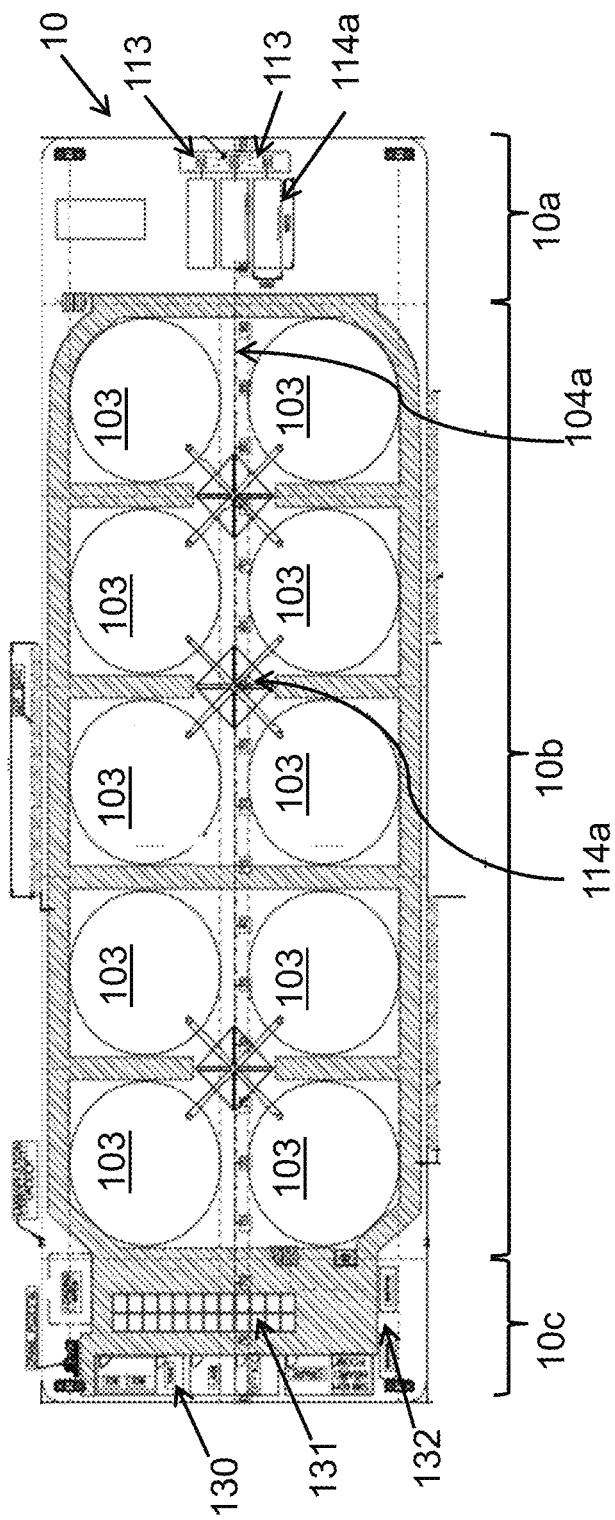
FIG. 2B is a plan view of the rectangular-shaped aquaculture production apparatus with fish tanks of FIG. 2A.
Figure 2C:
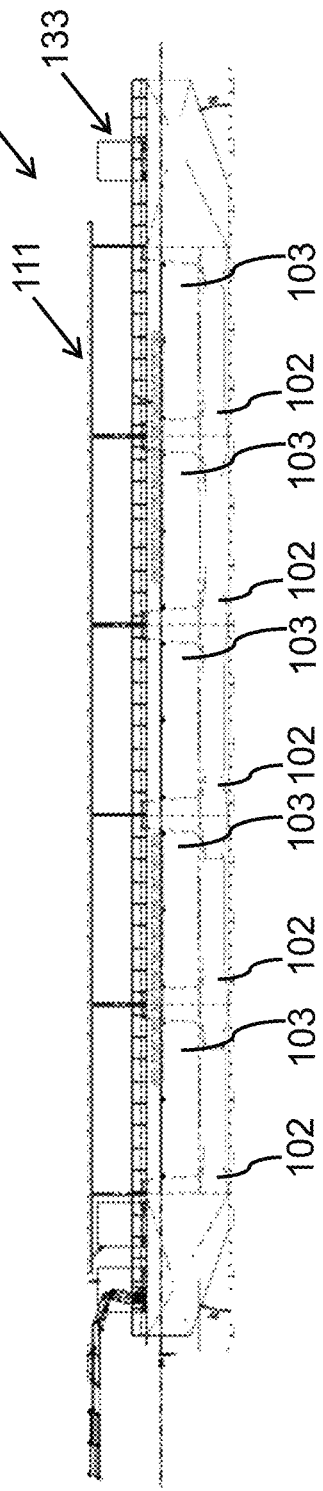
FIG. 2C is a side elevation view of FIG. 2A.

According to one aspect of the invention, an aquaculture production apparatus 10 is provided. Reference is made to FIGS. 1B and 1C illustrating one embodiment which is hexadecagon-shaped, i.e. 16-sided polygon, FIGS. 2A, 2B and 2C illustrating one embodiment which is rectangular-shaped, and FIGS. 2D, 2E, 2F and 2G illustrating one embodiment which is bowl-shaped.

The apparatus 10 comprises a hull 101 having a hull bottom portion 101a, opposed outer hull side portions 101c extended therefrom, and a centre hull portion 101b arranged between the outer side portions 101c and extending from the bottom portion 101a to define at least one recess between the centre portion 101b and the outer side portions 101c. At least the bottom 101a and the outer side portions 101c include watertight walls to define at least one ballast water space 102 therebetween. The bottom portion 101a may include at least one bottom ballast tank and provides the baseline of the hull 101 and is submersible in operative position. The outer side portions 101c may include void spaces or void tanks 140 to provide buoyancy to the hull 101 such that the hull 101, together with the cultivation tanks 103 which are loaded with water, remain semi-submerged in water with low freeboard when the apparatus 10, e.g. hull 101, is arranged in a body of water. The void spaces or void tanks 140 may be located at the ends of the outer side portions 101c, which are distal from the bottom portion 101a. The outer side portions 101a may include side ballast tanks. The centre portion 101b is arranged on or extends from the bottom portion 101a, e.g. integrally formed with the bottom portion 101a, and is located between the outer side portions 101c to provide separate recesses for receiving cultivation tanks 103.

FIG. 3A is a schematic cross-sectional view taken at a mid-ship section of a hull of an aquaculture production apparatus in operative position. Particularly, the cross-sectional profile of the hull in operative position includes a tilted down E-shape, e.g. E-shape which is 90-degree counter-clockwise rotated or rotated left by 90 degrees. The stem part of the E-shape corresponds to the submersible bottom portion 101a while the side arms of the E-shape correspond to the outer side portions 101c and the middle arm of the E-shape corresponds to the centre portion 101b. FIG. 3A further shows tanks 103 (in dotted lines) arranged in the recesses.

Figure 3C:
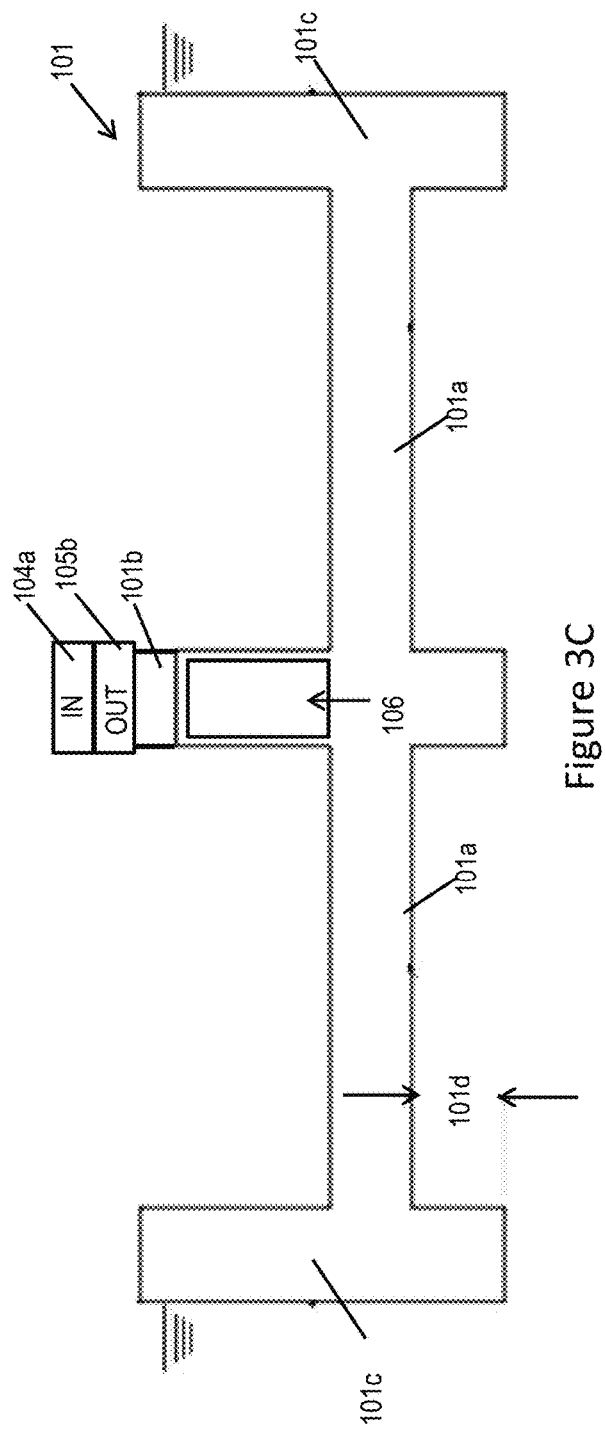
FIG. 3C shows the hull of FIG. 3A having appendages attached to the bottom and outer side portions.
Figure 3D:
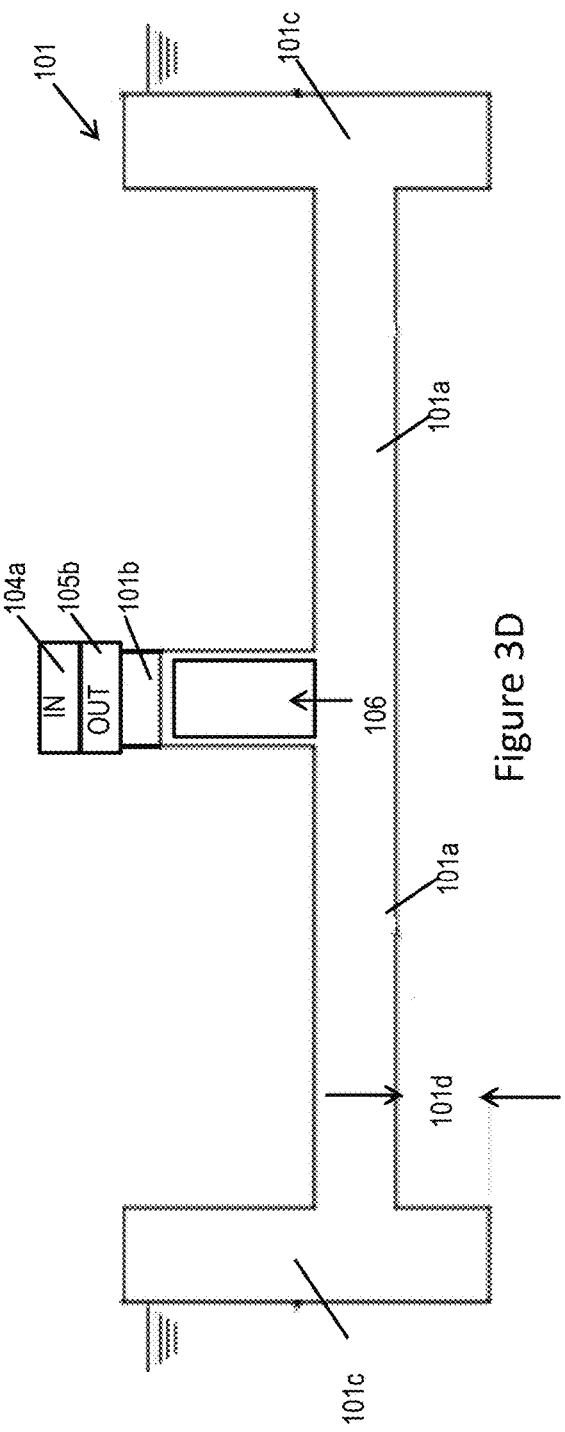
FIG. 3D shows the hull of FIG. 3A having appendages attached to the outer side portions.

Various modifications to the hull 101 of FIG. 3A may be envisaged. For example, FIG. 3B shows a hull, similar to FIG. 1C, having a top plan profile and a bottom plan profile, wherein the top plan profile is larger or has larger dimensions than the bottom plan profile. As such, the outer side portions 101c and bottom portion 101a form a tapered U-shape. FIG. 3C shows the hull of FIG. 3A having appendages 101d attached to the bottom 101a and outer side portions 101c. FIG. 3D shows the hull of FIG. 3A having appendages 101d attached to the outer side portions 101c.

Figure 3E:
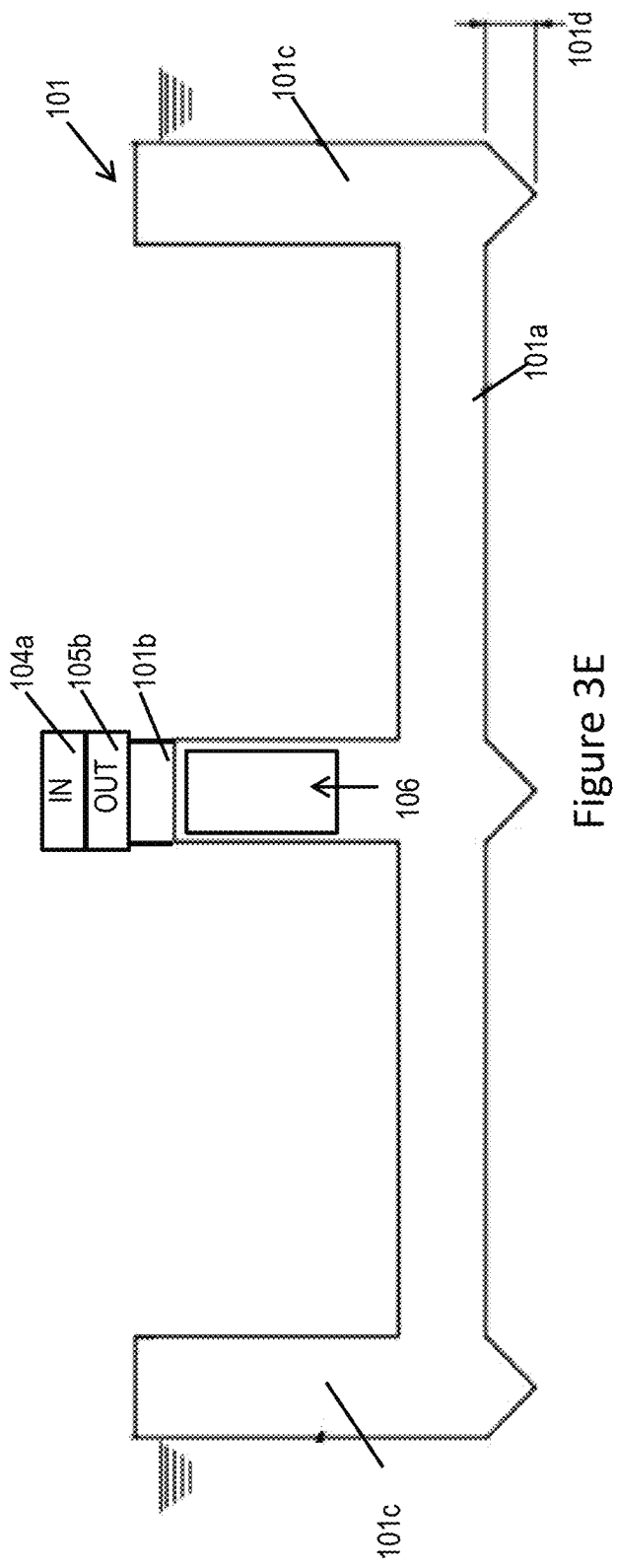
FIG. 3E shows the hull of FIG. 3A having tapered appendages attached to the bottom and outer side portions.
Figure 3F:
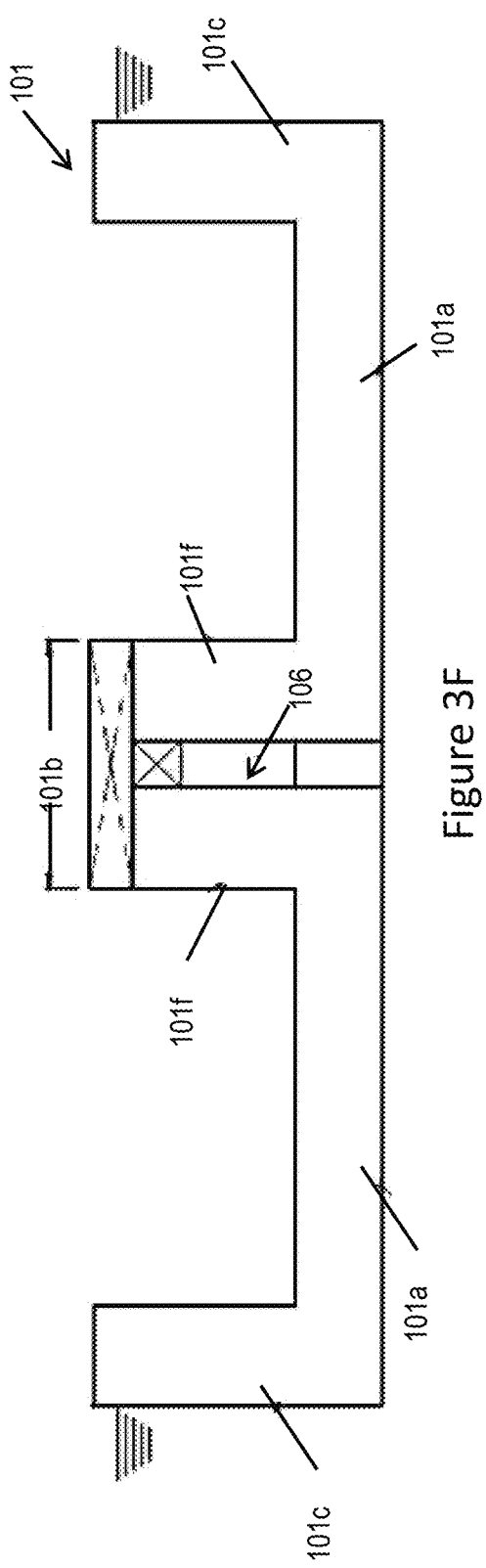
FIG. 3F shows a hull wherein the centre portion includes a plurality of inner hull side portions interposing a centre portion therebetween.
Figure 3G:
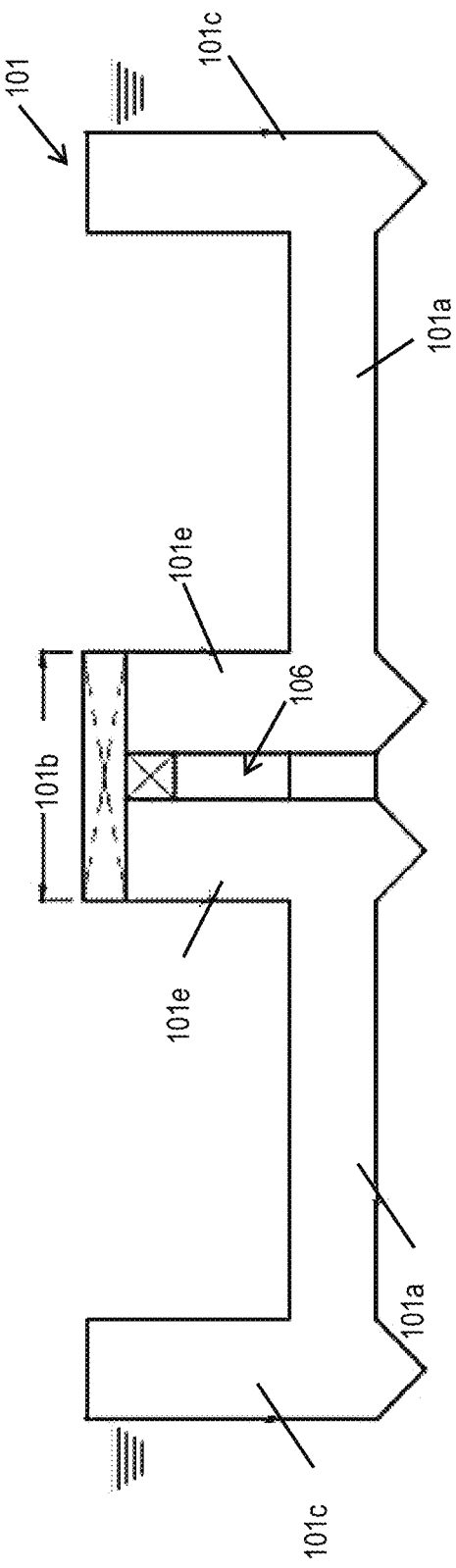
FIG. 3G shows the hull of FIG. 3F having tapered appendages attached to the bottom and outer side portions.
Figure 3H:
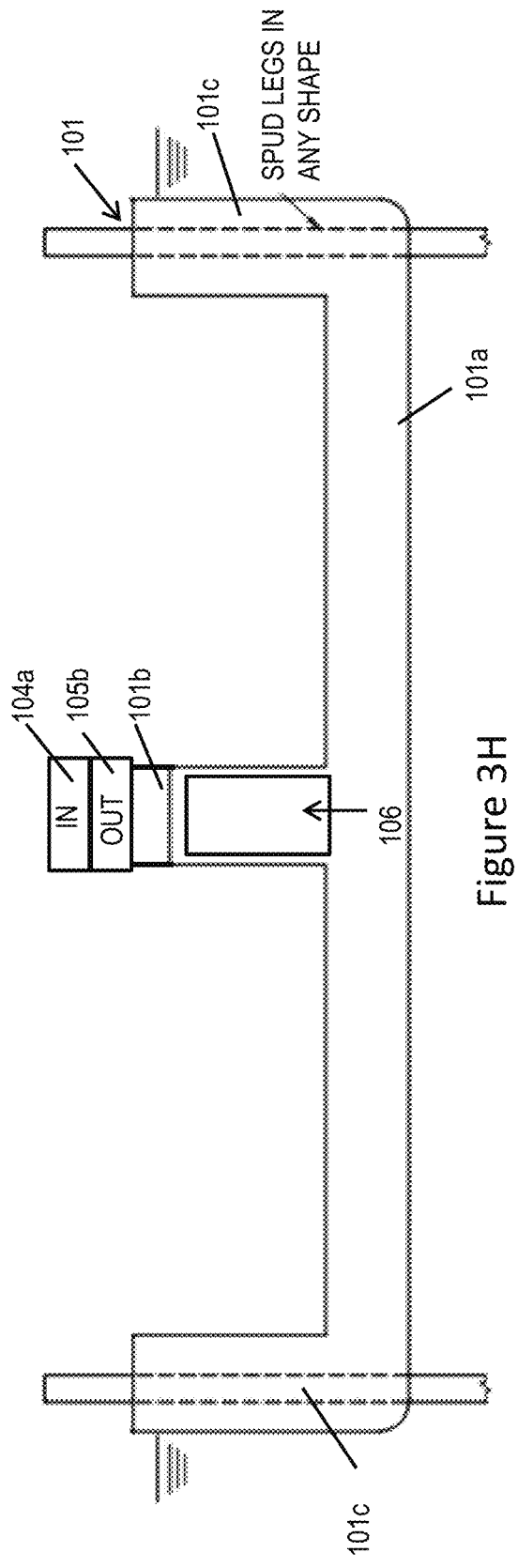
FIG. 3H shows the hull of FIG. 3A provided with spud pipes or other offshore flexible and/or fixed tension devices configured to secure the hull, such as to the bottom of a body of water, e.g. sea bed.

FIG. 3E shows the hull of FIG. 3A having tapered appendages 101d attached to the bottom and outer side portions 101c. FIG. 3F shows a hull wherein the centre portion 101b may include a plurality of inner hull side portions 101f interposing a passage 106 or duct tunnel therebetween, such that an inner side portion 101f and an outer side portion 101c provide a recess therebetween to support a cultivation tank 103 arranged in the recess. In the hull of FIG. 3F, the centre portion 101b includes ballast water space or tank 102, and the E-shape includes two U-shape structures which may be indirectly or directly attached to each other. FIG. 3G shows the hull of FIG. 3F having appendages 101d attached to the bottom and outer side portions 101c. FIG. 3H shows the hull of FIG. 3A having spud legs, e.g. columns or pipes, inserted through the outer side portions 101c and substantially parallel thereto.

Referring to the embodiments of FIGS. 1B and 1C, and FIGS. 2A to 2G, the centre portion 101b provides and/or increases strength to the hull 101. Furthermore, as shown in FIGS. 3A-3H, 2B and 1C, the centre portion 101b may provide support to the cultivation tanks 103. The centre portion is arranged generally at the centre of the hull. In embodiments where the hull is generally elongate, e.g. length is greater than beam (width), lengthwise dimension of the centre portion 101b may extend substantially along the length or longitude of the hull, e.g. substantially parallel to port and starboard of the hull. The centre portion 101b may be a continuous or connected structure, or discrete or unconnected structures. In embodiments where the hull is generally non-elongate, e.g. having circular or square top plan profile, the centre portion 101b may be arranged generally at the centre of the hull and a lengthwise dimension of the centre portion may extend substantially along a diameter or centreline of the hull. In some embodiments, the centre portion 101b may be provided with a through passage or duct tunnel which may provide access to various tanks 103 and an exit route for emergency evacuation. In some embodiments, the centre portion 101b may be provided with a dry caisson which is closable to provide an enclosed void space to provide further buoyancy to the hull. In the embodiment of FIG. 3F, the through passage or the dry caisson is arranged between opposed inner side portions wherein one of the opposed inner side portions, one of the outer side portions and a part of the bottom portion form a cross-sectional profile having two U-shapes, or two W-shapes, or two V-shapes. Generally, the passage or duct tunnel 106 may be enclosed at both ends by watertight hatches 118 provided at forward and aft (or rear) portions of the apparatus 10.

The centre portion 101b includes pipelines (e.g. pipes for waste and/or aquatic animals transfer, water supply pipes, oxygen pipes), control valves of the pipelines, cables, equipment which may be located in the through passageway 106.

The cultivation tanks 103 (see FIGS. 1C, 2B and 2C) may be provided as closed containment tanks 103 configured to create a controlled interface between the cultivated aquatic animals therein and the natural environment, such that aquatic animals such as fish may be grown in the cultivation tanks 103 without direct exposure to open sea water. One or more cultivation tanks 103 may be provided in each aquaculture production apparatus 10.

Figure 4A:
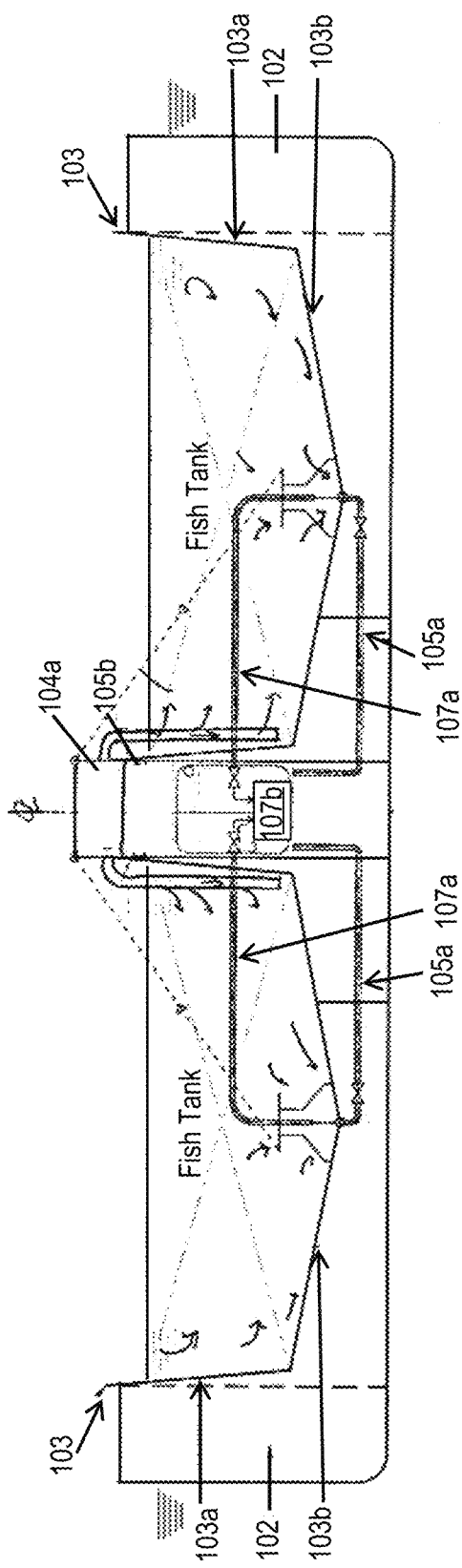
FIG. 4A is a sectional view of an aquaculture production apparatus wherein clean water, which may have been cleaned, filtered, sterilized, purified and/or oxygenated, flow to the inlet channel and is distributed or dispensed by gravity to each individual cultivation tank creating an effect like current of the open sea, and further shows the fish suction pipes and the waste discharge system.
Figure 4B:
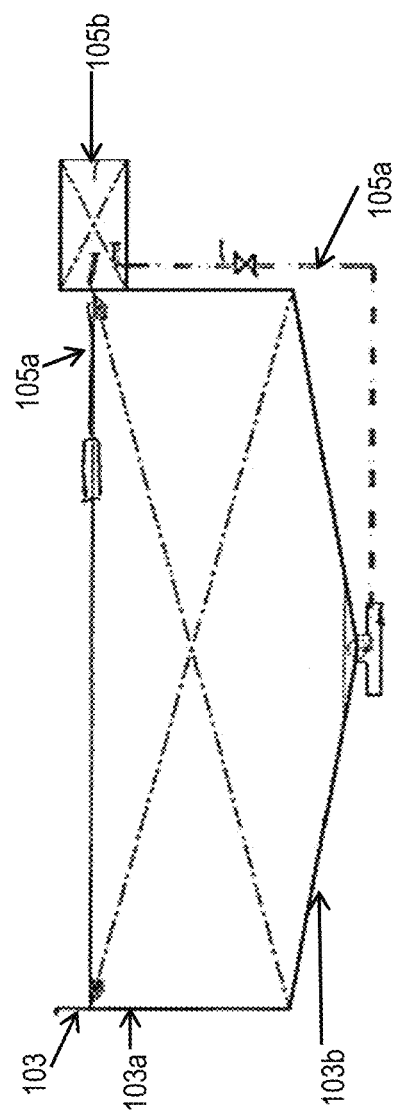
FIG. 4B is a close-up cross-sectional view of one of the cultivation tanks of FIG. 4A wherein waste accumulated at the lowest point of the cultivation tank, e.g. at its bottom section, and at topmost section, e.g. floating waste, are being discharged/removed via gravity siphonic effect, wherein this arrangement will be consistently positioned for all shapes of aquaculture production apparatus or Eco-Ark™.

Each cultivation tank 103 may be formed of rigid walls (see FIGS. 4A and 4B). Each cultivation tank 103 has a top or open portion 103a which is generally exposed to air and a bottom section or generally closed portion 103b which tapers towards an intermediate point thereof. In some embodiments, the tapered bottom portion 103b may include a conical portion, e.g. reverse cone, or conoidal portion. In some embodiments, the top portion 103a may be provided as a cylindrical portion or with circular opening. In some other embodiments, the top portion may be provided with an opening having other polygonal shape, e.g. octagon, or non-polygonal shape.

In some embodiments, the cultivation tanks 103 are abuttedly arranged between the centre portion 101b and the outer side portions 101c, e.g. at least some of the cultivation tanks form a contiguous structure with the centre portion 101b and the outer side portions 101c to provide at least one transverse bulkhead to the hull 101 (see FIG. 3A).

The ballast water spaces 102 are arranged into a plurality of tanks or compartments 102a along a perimeter, e.g. length or circumference of the hull 101 (see FIG. 9), wherein each compartment 102a is configured to be ballasted in response to a discharge of aquatic animals and water from one of the cultivation tanks 103 being adjacent to the each compartment 102a to allow the hull 101 maintain equilibrium in the body of water. For example, if tank No. 1P is discharged of aquatic animals, ballast water space in compartment 102 which is most adjacent to tank No. 1P is ballasted or receives water.

Figure 4C:
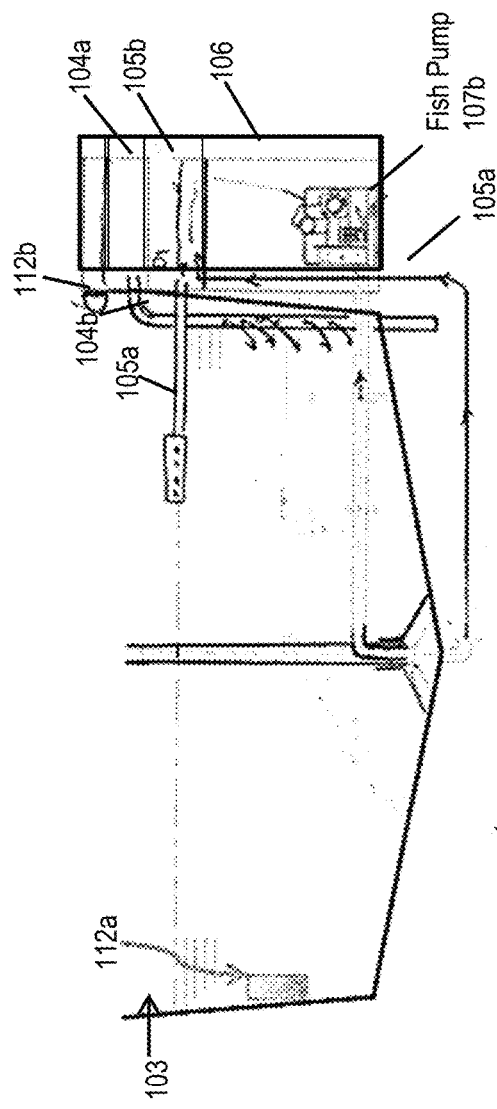
FIG. 4C is a mid-body cross-sectional view of an aquaculture production apparatus.
Figure 4D:
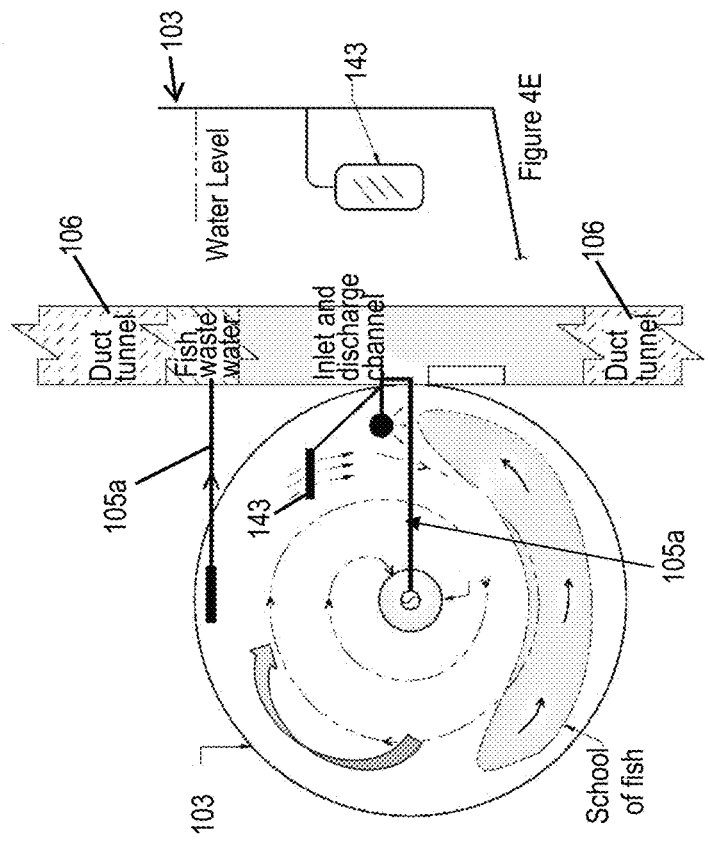
FIG. 4D is a plan view of one cultivation tank having clean water supplied from the inlet channel via a water supply pipe which has spaced openings to create a circular water current in the tank, and having waste water discharged from the lowest point of the cultivation tank to siphon the bottom section of the tank and from the top section of the fish water level to the discharge channel.

The cultivation tanks 103 are configured to receive clean water from at least one water source through an inlet channel 104a and a plurality of water supply pipes 104b (see FIGS. 4A, 4D). Particularly, the inlet channel 104a is fluidly coupled to at least one water source, e.g. water stored in ballast water spaces 102, or a body of water external to the hull 101, to receive water therefrom. The plurality of water supply pipes 104b are fluidly coupled between the inlet channel 104a and the cultivation tanks 103. A portion of each water supply pipe 105b may be submerged in the water of a cultivation tank 103 and may include spaced openings or nozzles configured to discharge water into one of the cultivation tanks 103. The openings may be vertically spaced to produce a circular water current in the cultivation tanks 103 to compel the fish therein to exercise due to their tendency to swim against water current.

To provide a waste water discharge system, the cultivation tanks 103 are further configured to discharge waste and/or water therefrom through a plurality of tank discharge pipes 105a and a discharge channel 105b (see FIGS. 4A, 4B, 4D). Particularly, the tank discharge pipes 105a may fluidly couple between the cultivation tanks 103, e.g. bottom and/or top section thereof, and the discharge channel 105b. The discharge channel 105b may be fluidly coupled between the tank discharge pipes 105a to a discharge destination, e.g. a water body external to the hull or a waste water storage tank 116 onboard the hull.

The tank discharge pipes 105a are fluidly coupled to bottom sections of the cultivation tanks 103 and configured to discharge water, including waste or scum, from the tank 103 to the discharge channel 105b by gravity siphonic drainage. Furthermore, the discharge channel 105b is arranged proximate to or in fluid coupling with top sections of the cultivation tanks 103 to receive an overflow from therefrom. Accordingly, water and waste from a tank 103 may be siphoned off from its top and bottom sections via tank discharge pipes 105a to the discharge channel 105b without requiring pump and/or electrical power.

The tank discharge pipes 105a and the water supply pipes 104b are respectively configured to discharge water from the cultivation tanks 103 and supply water to the cultivation tanks 103 at a similar flow rate to maintain the volume of water in each tank 103 at a relatively constant level. To this purpose, valves may be provided at tank discharge pipes 105a and water supply pipes 104b to control flow rate of the respective pipes. Valves provided to discharge pipes 105a at bottom section and top section of the tank 103 may be separately adjustable to vary the flow or discharge rates therefrom.

The inlet channel 104a and the discharge channel 105b are arranged on the centre portion 101b of the hull 101. Particularly, the inlet channel 104a is arranged over, e.g. vertically stacked above, the discharge channel 105b which is arranged over, e.g. vertically stacked above, the centre portion 101b of the hull 101 (see FIGS. 4A and 4D). The inlet channel 104a may be provided as a trough or an open-top pipe while the discharge channel 105b may be provided as a closed-top pipe or conduit.

In some embodiments, the inlet channel 104a and the discharge channel 105b are arranged at an incline or sloping between a bow (or an assigned forward portion of the hull) and a stern (or an assigned aft or rear portion of the hull), or vice versa, of the hull 101 to allow flow of the clean or fish production water and waste water through the inlet channel 104a and the discharge channel 105b respectively by gravity. Accordingly, discharge of waste water via discharge channel 105b may not require pump and/or electrical power. Supply of clean water via inlet channel 104a to tanks 103 may not require pump and/or electrical power.

Figure 11A:
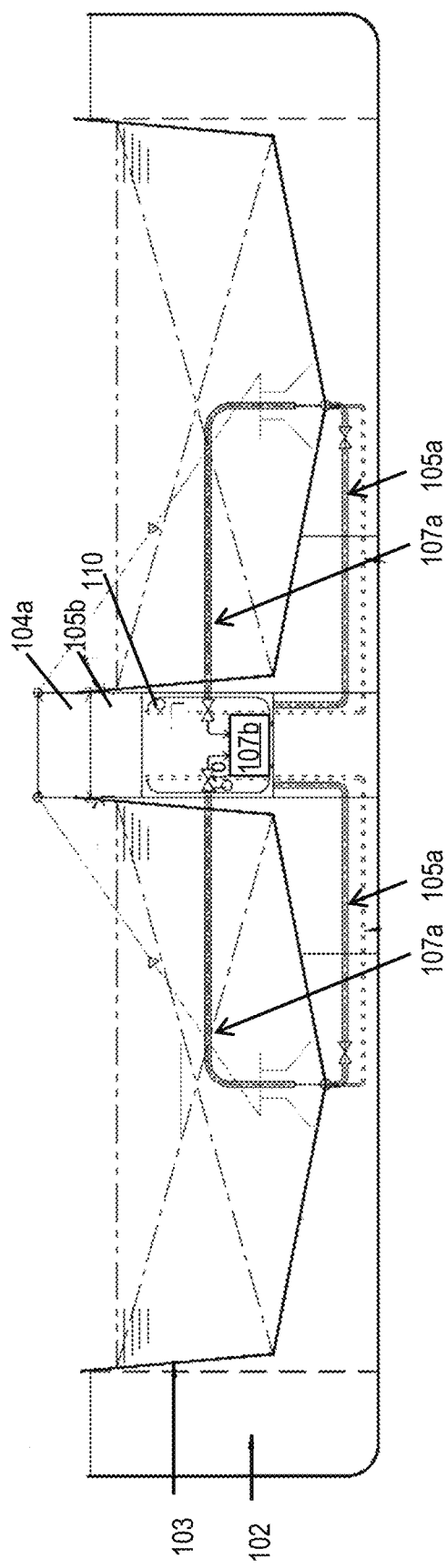
FIG. 11A is a sectional view of the apparatus showing a fish or waste water discharge system.
Figure 11B:
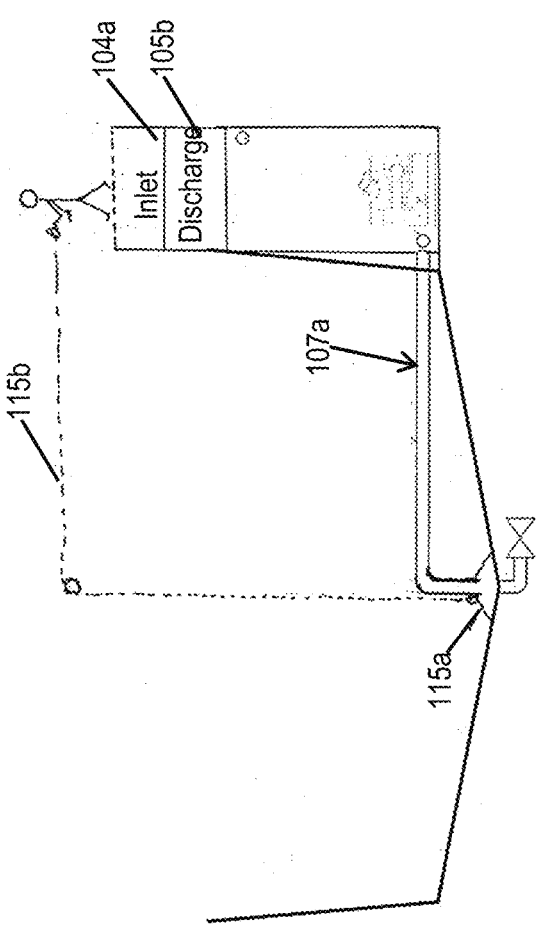
FIG. 11B is a cross-sectional view of the aquaculture production apparatus having a large-waste and dead fish discharge system.

A strainer (see FIGS. 4A, 11B) may be positioned at or proximate to the inlet of a tank discharge pipe 105a and configured to prevent entry of aquatic animals into the tank discharge pipe 105a when waste water and/or scum are being discharged from the tanks 103, and further configured to allow entry of aquatic animals into an aquaculture transfer pipe 107a when aquatic animals are being discharged from the tanks 103. Particularly, the inlets of a tank discharge pipe 105a and an aquaculture transfer pipe 107a may be located within a chamber, arranged within the tank 103, wherein the chamber's inlet is provided with the strainer. By removing the strainer to unblock the inlet of the chamber, aquatic animals may be allowed entry into the chamber and pipes 105a, 107a. By disposing the strainer to block the inlet of the chamber, aquatic animals may be blocked from entering the tank chamber and pipes 105a, 107a. The strainer may be controlled by a line or cable 115a having a first end coupled to the strainer and a second end extending out of the tank 103 for access by an operator.

Figure 13A:
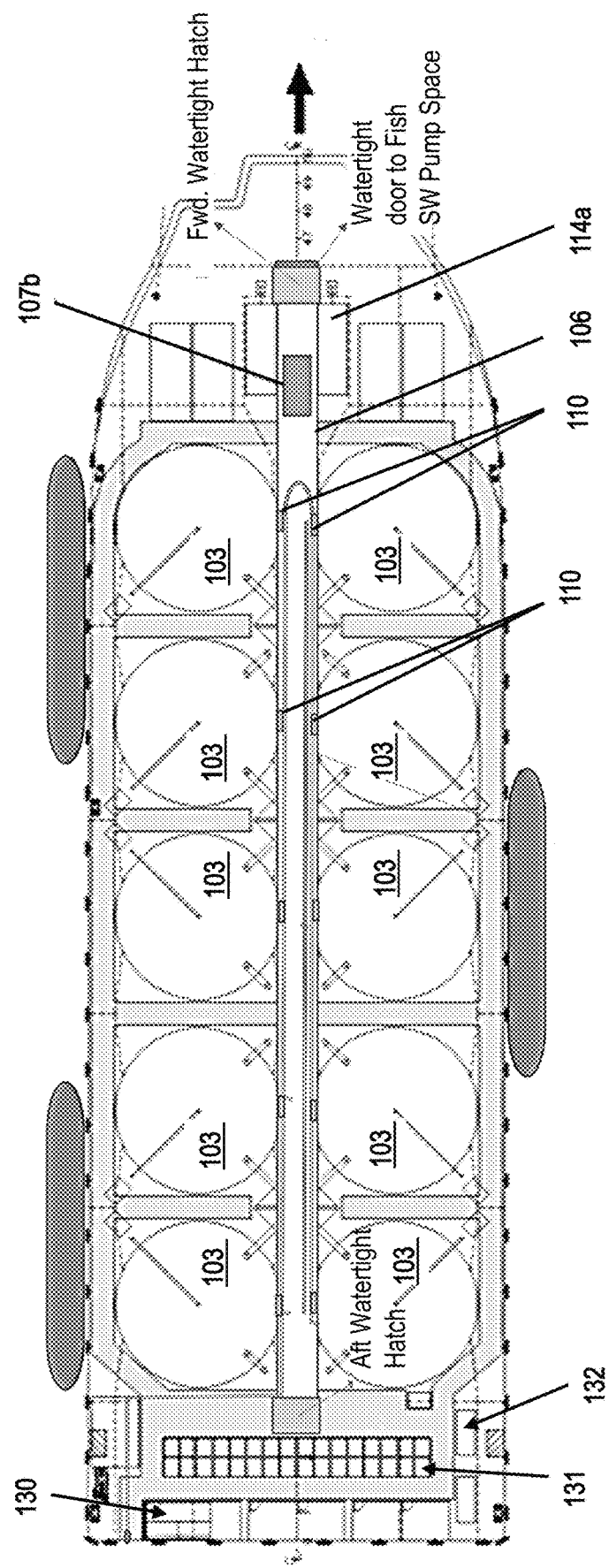
FIG. 13A is a plan view of a standalone aquaculture production apparatus having an aquaculture transfer system.

For discharge or transfer of aquatic animals from a tank 103 (see FIGS. 4A, 5, 13A), the outlet of the aquaculture transfer pipe 107a is fluidly coupled to an aquaculture transfer pump 107b which is fluidly coupled to custodian transfer apparatus 30 to transfer tank contents, including water and aquatic animals, to the custodian transfer apparatus 30. After aquatic animal transfer operation is completed, the aquaculture transfer pump 107b is disconnected from the tank discharge pipe 105. The aquaculture transfer pump 107b may be disposed in the passage 106 and movable along the passage vis-a-vis duct tunnel 106 to access any of the tanks 103.

Figure 5:
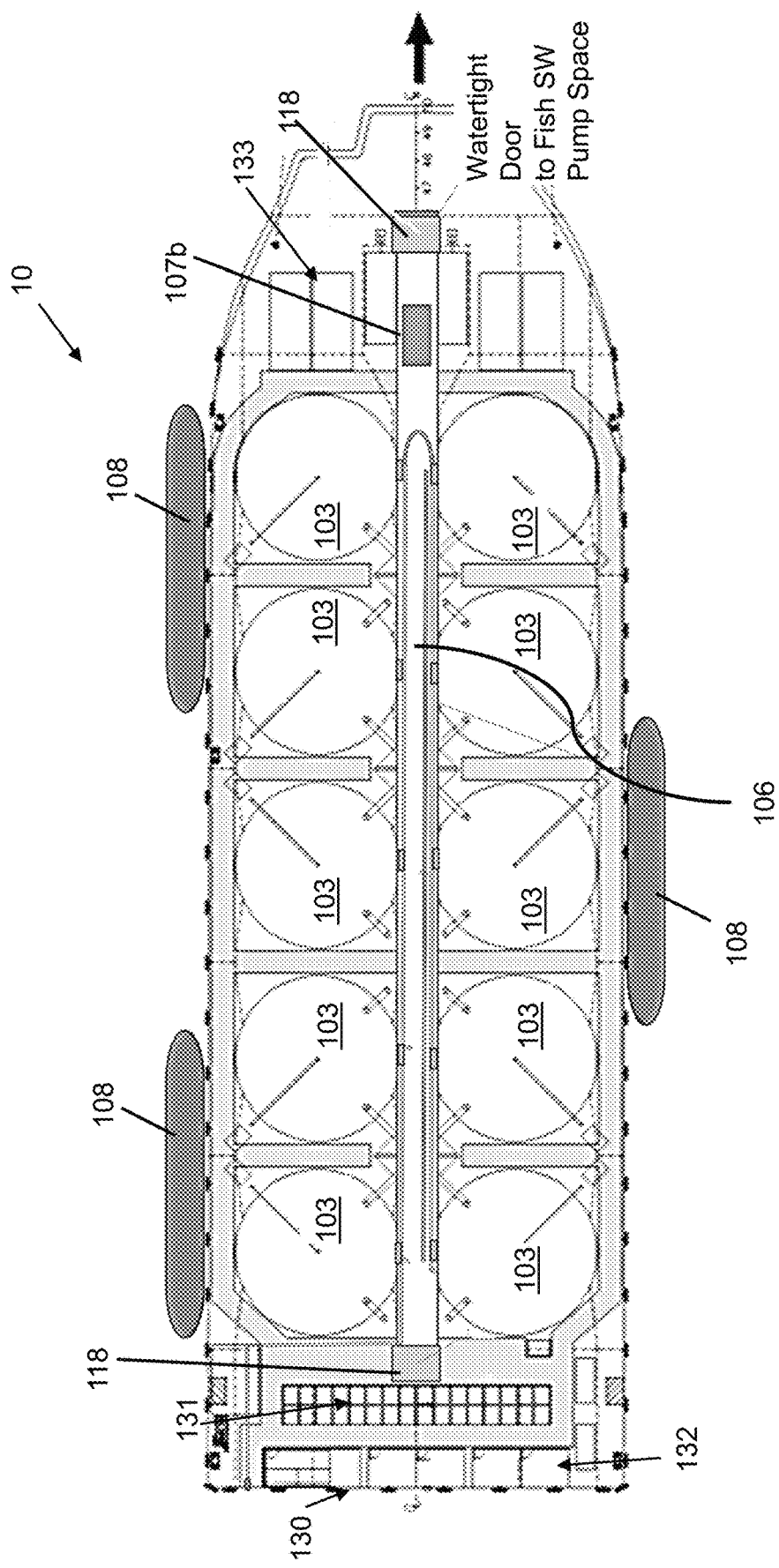
FIG. 5 shows a plan view of an aquaculture production apparatus having a passageway (duct tunnel) provided along a longitude or length along the centre portion of the hull.
Figure 13B:
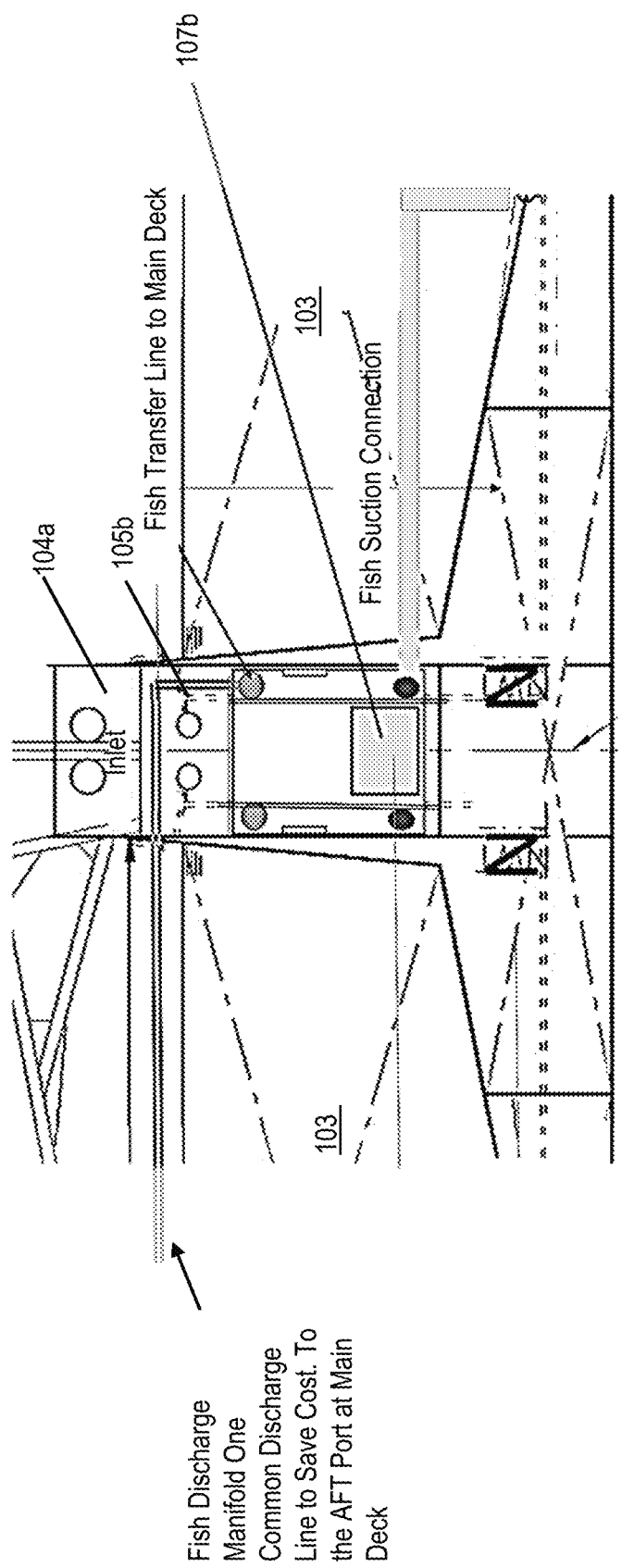
FIG. 13B is a sectional view of the aquaculture production apparatus having an aquaculture transfer pump located at the passageway and vis-a vis the duct tunnel and aquaculture discharge to one common aquaculture/fish transfer manifold and thereafter to a custodian transfer apparatus.
Figure 13C:
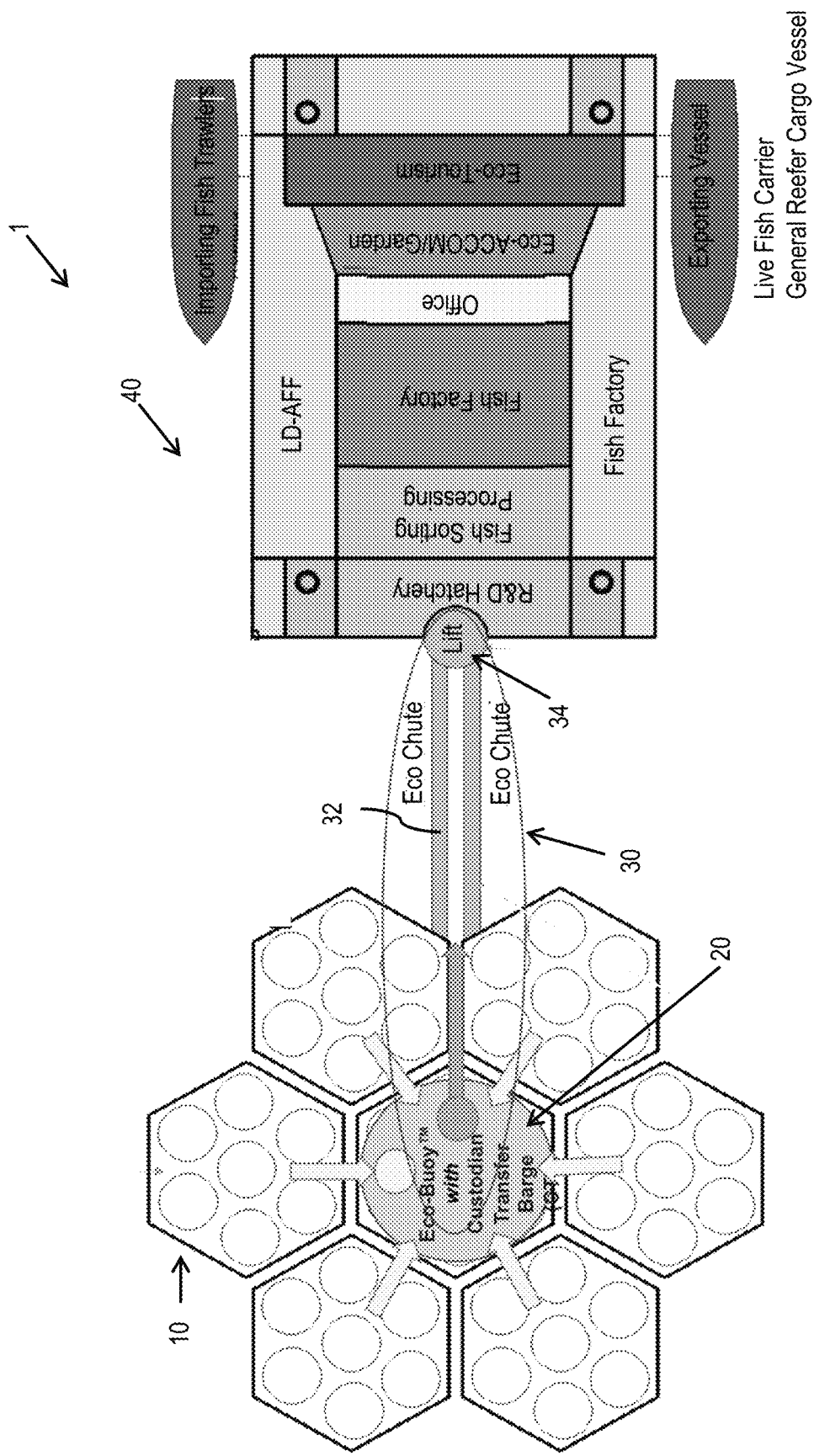
FIG. 13C is a plan view of an aquaculture production and transfer system according to one embodiment of the invention.
Figure 14:
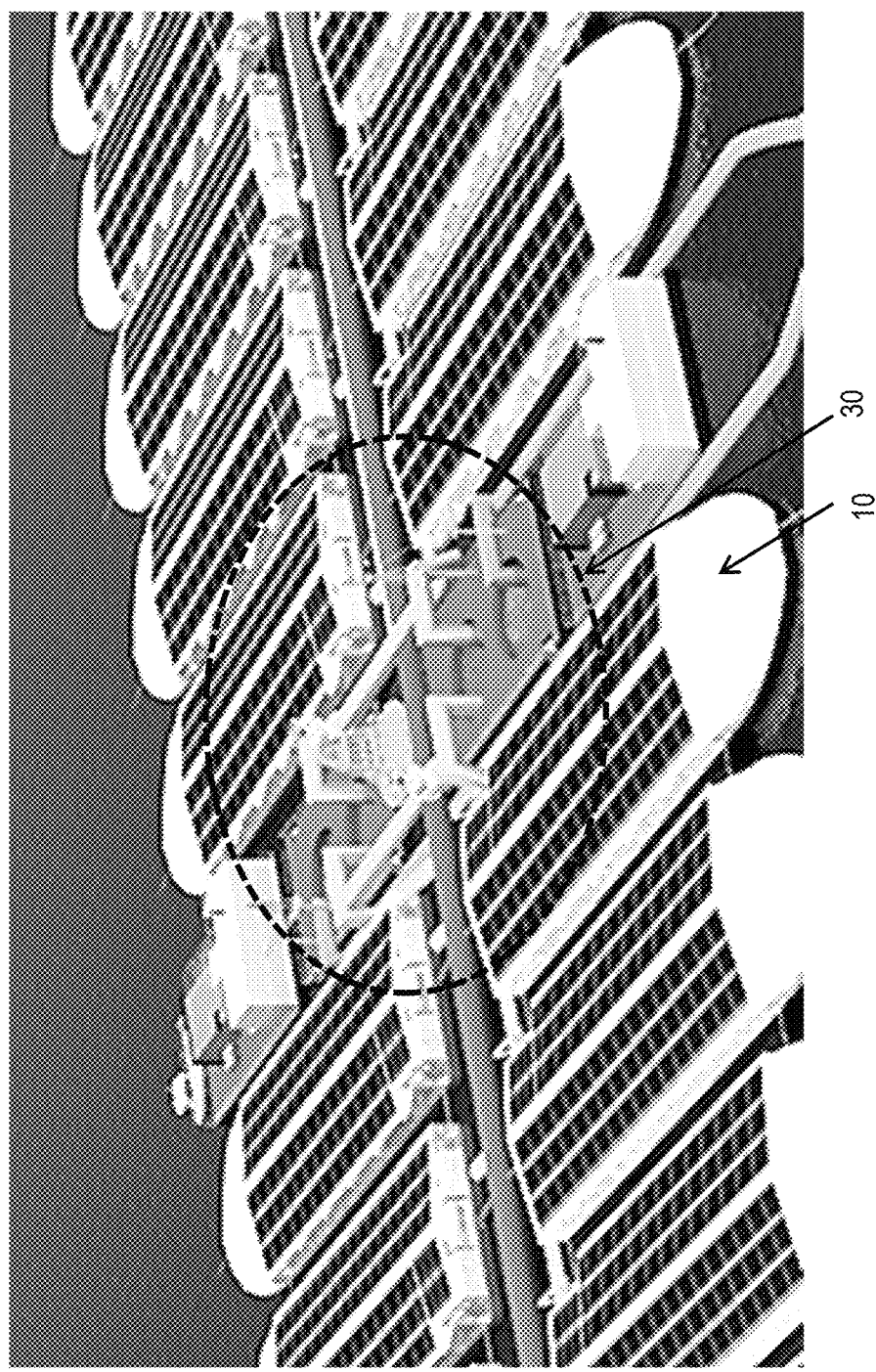
FIG. 14 is a perspective view of a station keeping apparatus coupled to a fleet of aquaculture production apparatuses.
Figure 15:
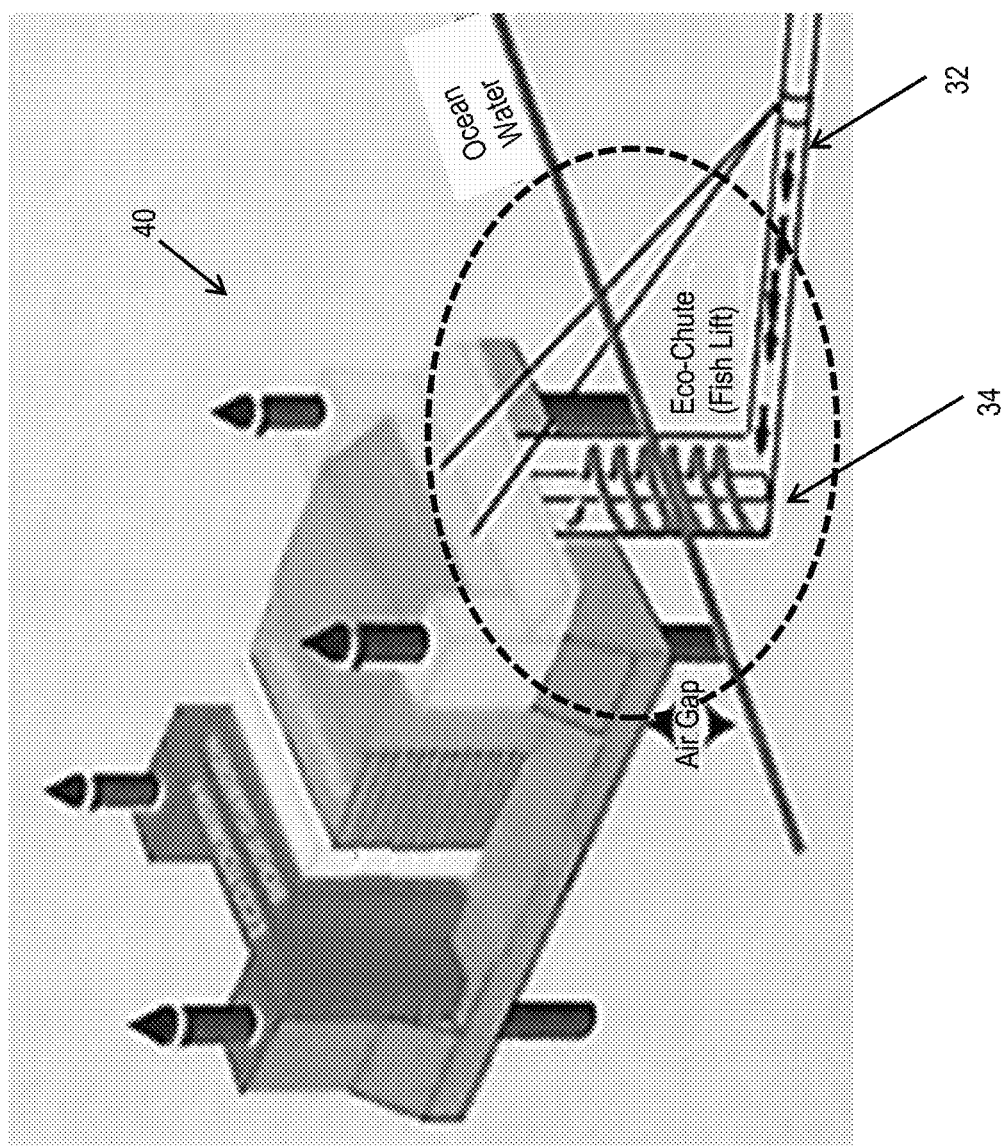
FIG. 15 show the side elevation view of a chute provided by a custodian transfer apparatus, wherein a vertical fish lift pump is provided at/near the outlet of the chute to transfer aquatic animals to an amalgamated facility.

Display units 110, e.g. monitor screen, may be installed along the passage 106 to allow viewing of the tank contents (see FIGS. 4C, 5, 13B). To this purpose, cameras may be installed underwater (camera 112a) and/or above the cultivation tanks 103 (camera 112b) and communicably coupled to the display units 110. Biomass sensors 143 may be provided in tanks 103 (see FIGS. 4D and 4E) to detect sizes of aquatic animals and therefore a determination may be made as to whether the aquatic animals in a tank, e.g. fish, may be harvested. The biomass sensors 143 may be communicably coupled to the display units 110 to provide fish size parameters. The display units 110 may also provide tank parameters e.g. water and flow.

Inflatable oxygen rubber tanks 108 (see FIG. 13A) may be disposed along the port and/or starboard side for storing oxygen. The oxygen rubber tanks 108 may be fluidly coupled to oxygen pipes for transfer of oxygen from the rubber tanks 108 to the cultivation tanks 103. These rubber oxygen storage tanks 108 act also as ship-side rubber fenders and oxygen storage for emergency when the oxygen generator on board fails. There are also liquid oxygen cylinders stored on board to ensure in emergency there is always enough oxygen for the fish production. The liquid oxygen may be used in line with the cooling refrigeration system to cool the fish production water in time when there is sudden surge in water temperature.

Figure 6A:
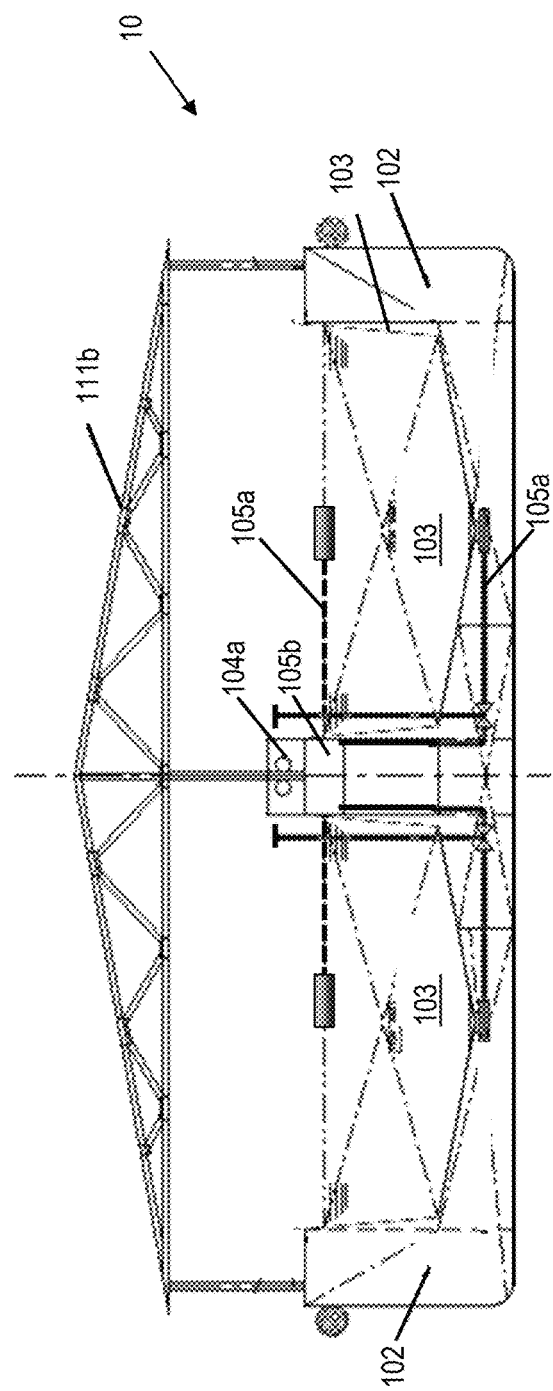
FIG. 6A is a cross-sectional view of a hull of an aquaculture production apparatus having a roof.
Figure 6B:
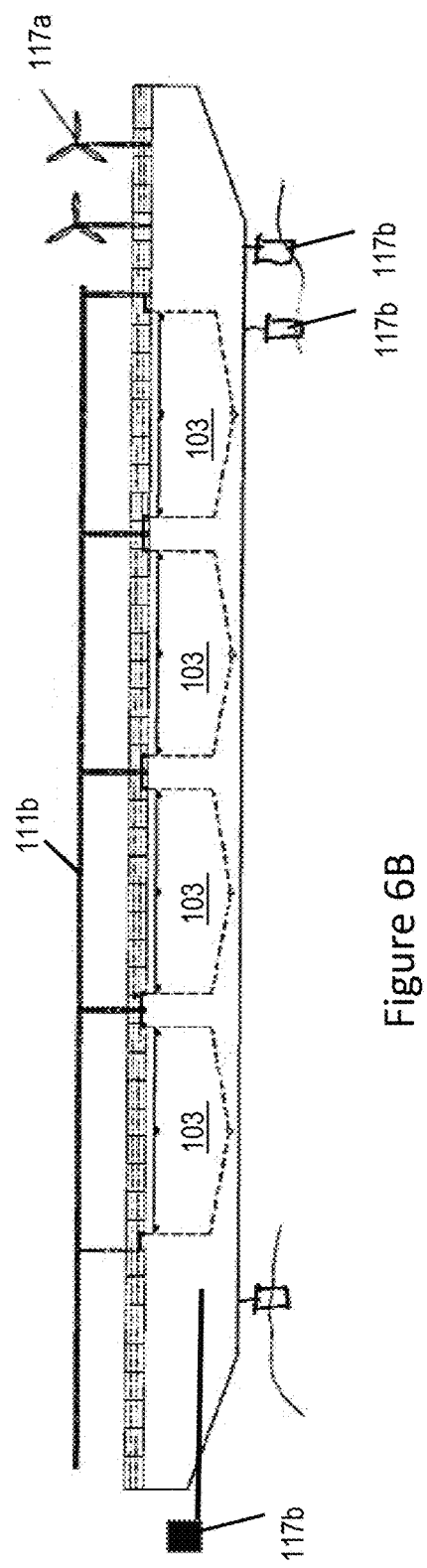
FIG. 6B is a side elevational view of a hull of an aquaculture production apparatus having solar cells, or water turbine configured to generate electricity from water flow at the outlet of the discharge channel, or wind turbine configured to generate electricity from wind, or underwater tidal current turbine or finned blades (see FIGS. 1C and 3B) configured to generate electricity from underwater or ocean tidal current, or combinations thereof.
Figure 6C:
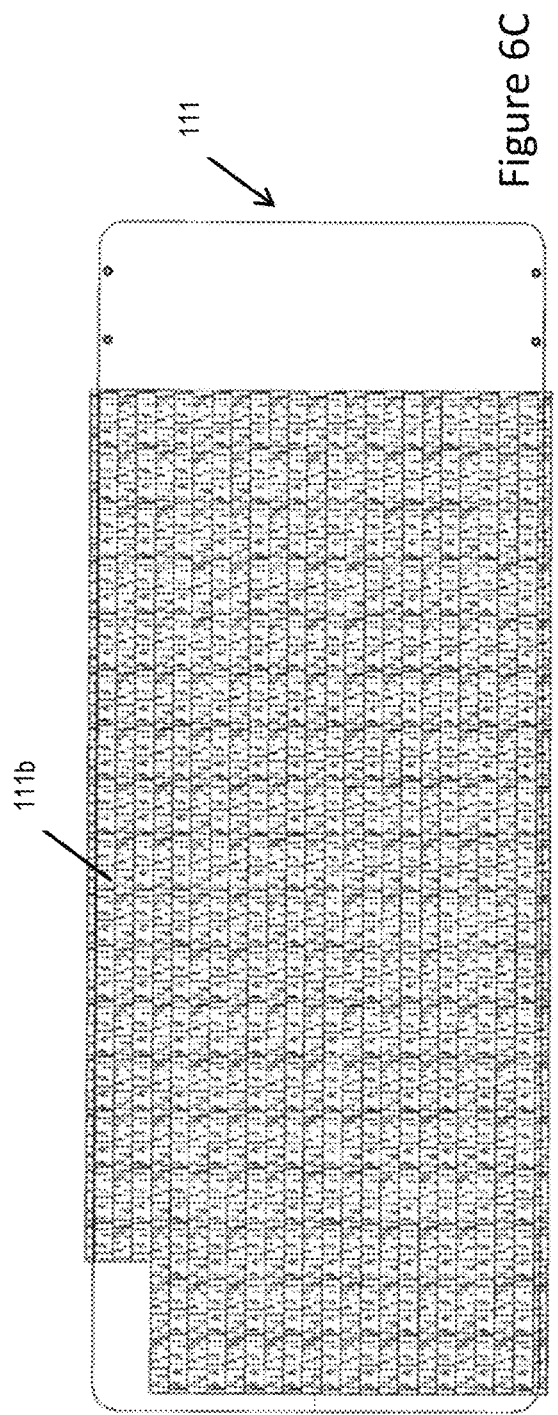
FIG. 6C shows a plan view of an aquaculture production apparatus having solar panels incorporated to the roof of FIG. 6A.
Figure 7:
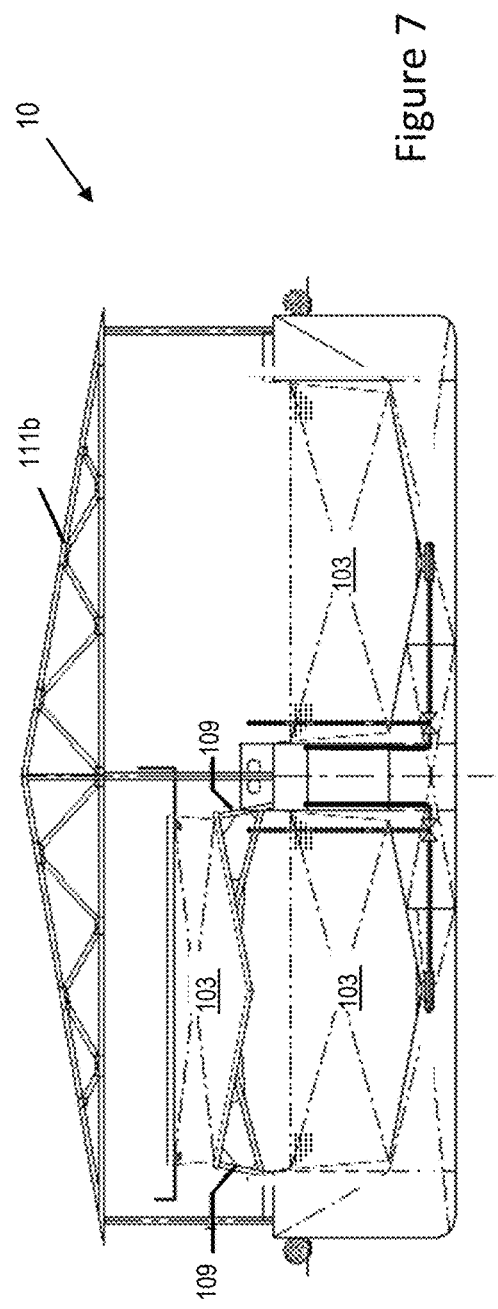
FIG. 7 is a cross-sectional view of a hull of an aquaculture production apparatus having vertically stacked second-tiered cultivation tanks.

One or more roofs 111 (see FIGS. 6A and 6B) may be arranged over the cultivation tanks 103. Each roof 111 may include a transparent portion 111$a$ for allowing sunlight to reach the tanks and/or at least one solar panel 111$b$ which is configured to convert solar energy into electrical energy. A hydrogen converter may be electrically coupled to the solar panel and configured to receive electrical energy therefrom to convert sea water into a hydrogen fuel and an oxygen gas which is to be circulated to the tanks 103. The hydrogen fuel may power fuel cells for providing electrical power required by equipment on the aquaculture production apparatus. Diesel-oil driven power generating equipment and/or wind turbines may be further provided to provide electrical power.

Wind turbine 117$a$ and/or water turbine generator 117$b$ (see FIG. 6B) may be provided to the aquaculture production apparatus 10 to generate electrical power from wind and water currents respectively.

A perforated cover, e.g. netting, may be arranged to overlay at least one cultivation tank 103 to prevent predators from entering and accessing aquatic animals in the tank 103.

The aquaculture production apparatus 10 may include a vertically-stacked arrangement of tanks 103. Particularly, a lower tank 103 is supported between an outer side portion 101$c$ and a centre portion 101$b$ of a hull 101 as described in the foregoing description. A tank support structure 109 is arranged on the outer side portion and the centre portion 101$b$ of the hull 101, and an upper tank is arranged on the tank support structure 109. The lower and upper tanks 103 may be provided with features described in the foregoing description.

The aquaculture production apparatus 10 may include a Supervisory Control and Data Acquisition (SCADA) or control system configured with many sensors and cameras and all types of measuring devices; to measure size and/or biomass of aquatic animals, and control and monitor feeding rate and timing, the oxygenation and its level of dissolved oxygen and other unwanted, pH value, salinity, water quality, circulation management and power management.

A water production and/or circulation system may be provided to allow the aquaculture production apparatus operate on different modes wherein the inlet channel 104$a$ is configured to alternatively receive water from a body of water external of the hull 101 or from any of the ballast water spaces 102. The water production and/or circulation system includes a water inlet pump 113, e.g. a submersible pump located within or external of the hull, at least one valve 150 to switch or alternate between water intake between water sources by alternatively fluidly coupling inlet pump 113 to one of the water sources, a filtration system 114, inlet channel 104$a$, discharge channel 105$b$, pipes 104$b$, 105$a$, at least one sensor configured to detect an adverse condition in the body of water external of the hull, e.g. poor water quality and/or oil pollution, and possibly a controller or computing unit which is communicably coupled to the sensor, and possibly other pipes and/or valves. Based on data acquired by the sensor(s), the controller or computing unit may be configured to determine a presence or an absence of adverse condition and accordingly actuate the valve 150 as well as any of the above-described components of the water production and/or production system to operate in either normal mode or recirculation mode.

Figure 10:
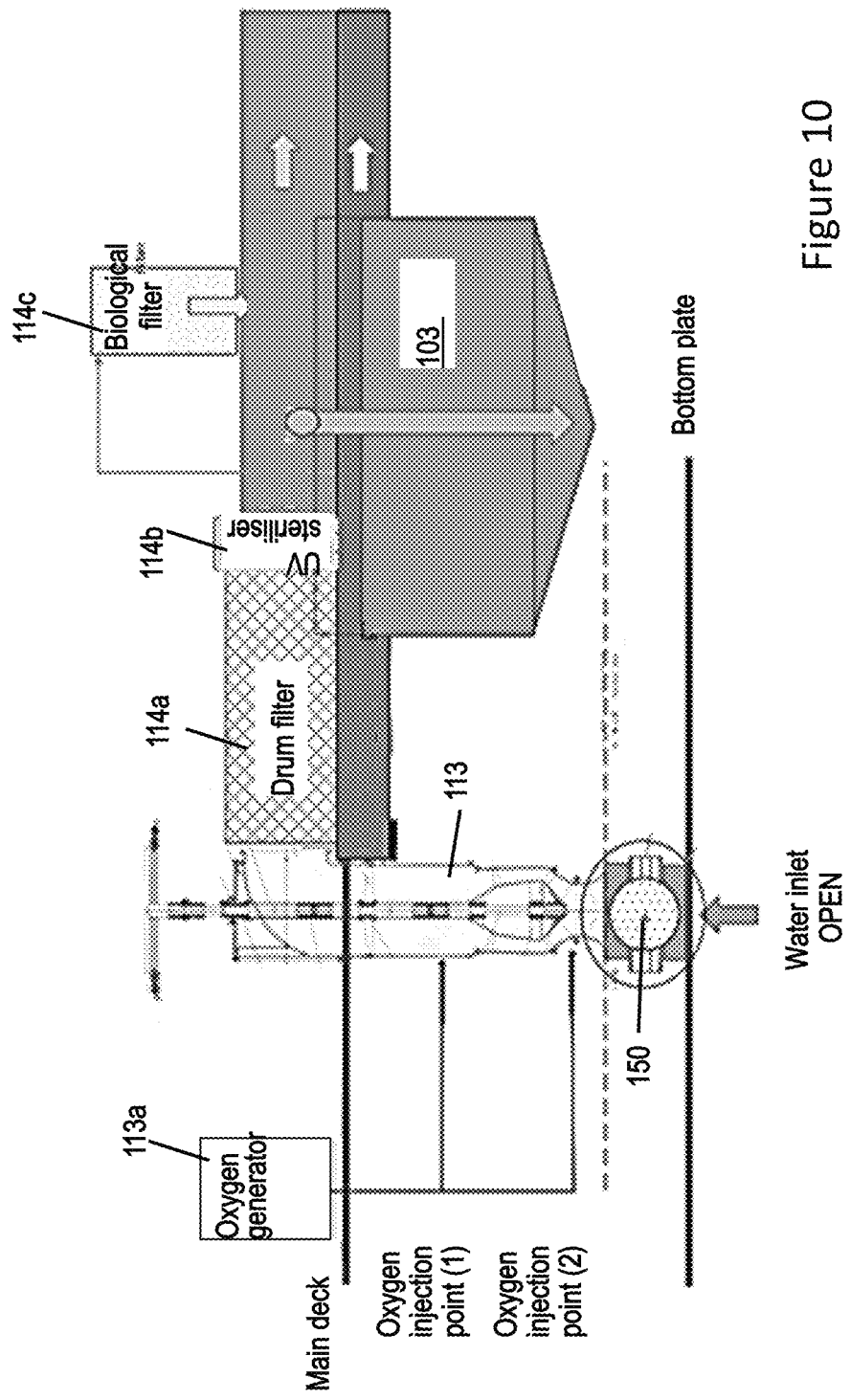
FIG. 10 is a side elevation view of a clean water production and/or circulation system.
Figure 12A:
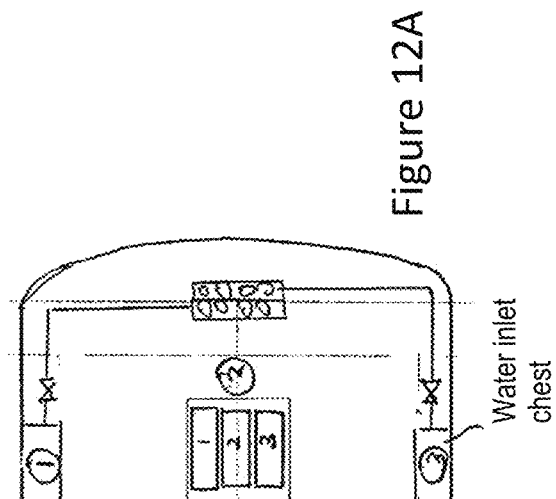
FIG. 12A is a plan view of a pump room in the bow of the aquaculture production apparatus, which is well equipped with sensors to detect adverse external condition of poor quality water and oil pollution and is configured to activate full recirculation mode of the fish water production system when the aquaculture production apparatus is faced with emergency and the algae bloom/red-tide and other water pollution in the body of water external to the apparatus.

In a normal or flow through mode (see FIG. 10), the water source is a body of water external of the hull and therefore the water inlet pump 113 is disposed in fluid communication with the body of water external of the hull and configured to draw water therefrom. To this purpose, the valve 150 may be configured to be actuated to block fluid communication with the ballast water space 102 and allow fluid communication with the body of water external of the hull 101. The water pump 113 is configured to transfer the drawn water to the filtration system 114$a$, 114$b$ and 114$c$ to produce filtered and sterilized high quality water. The inlet channel 104$a$ is configured to receive filtered water from the filtration system 114, which is to be distributed to the various tanks 103 via the inlet channel 104$a$ and water supply pipe 104$b$. The filtration system may include drum filters 114$a$, an ultraviolet or other type of sterilizer 114$b$, and/or biological filters 114$c$. An oxygen generator 133 may be provided and configured to inject oxygen into the water drawn into/by the water inlet pump 113. The discharge channel 105$b$ is configured to receive waste water from the tanks 103, which is to be discharged into the body of water external of the hull 101. Accordingly, in this mode, water is taken from a water body external of the hull 101 to provide clean or fish production water, and waste water is returned to the same water body.

Figure 12B:
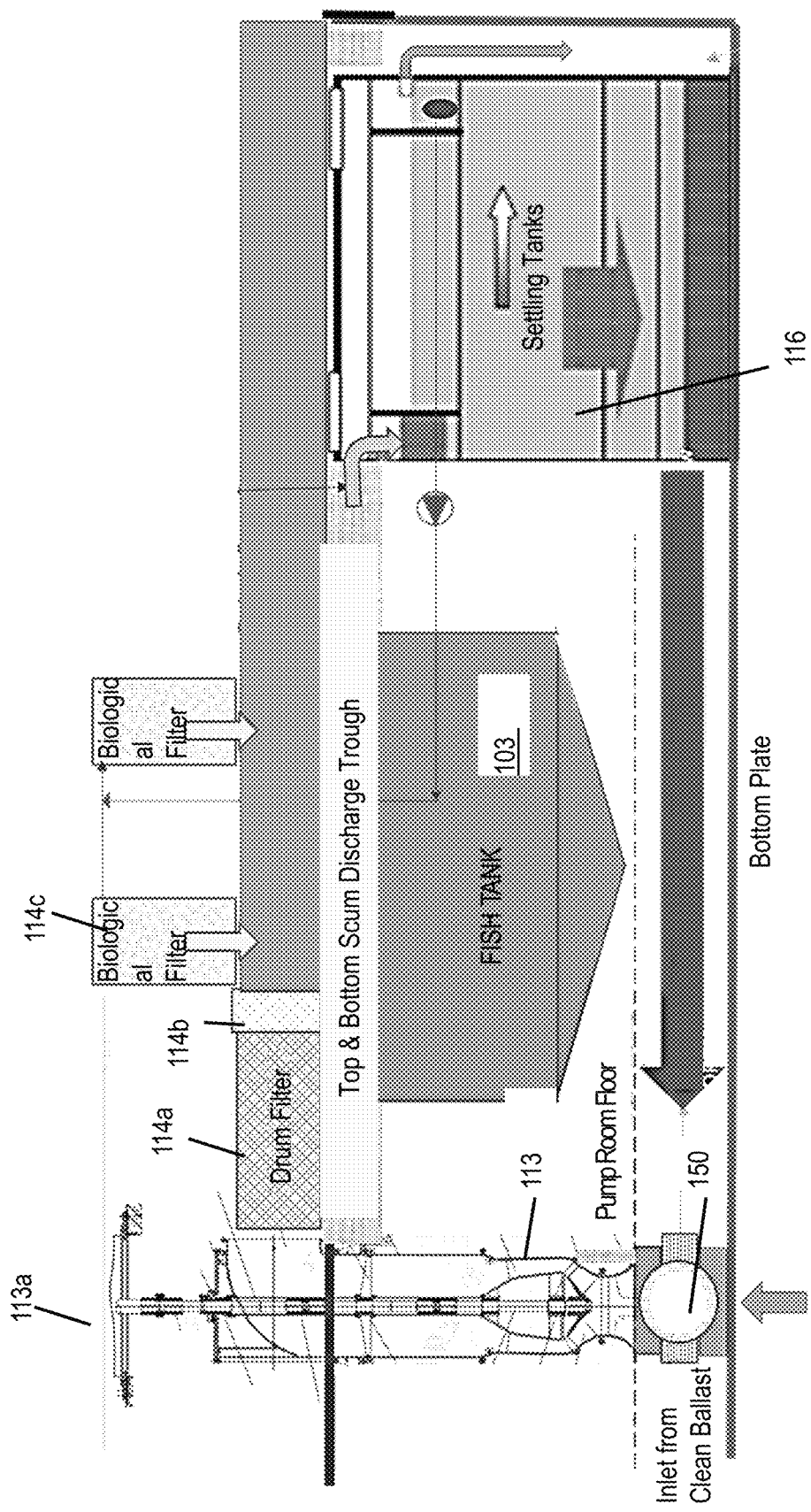
FIG. 12B show a schematic side elevation view of the aquaculture production apparatus and its recirculation and with controlled flow through mode.

In a recirculation mode (see FIG. 12B) which is useful when a body of water external of the hull 101 is unsuitable for supplying water to the apparatus 10 upon detection from its sensors or external reports or a determination by a controller or computing unit based on data acquired from the sensors, e.g. due to pollution or red tide, the water source is water stored in ballast water spaces 102 and therefore the water inlet pump 113 is disposed in fluid communication with the ballast water spaces 102. The valve 150 may be provided at an inlet of the water inlet pump 113 and configured to be actuated to block fluid communication with the body of water external of the hull 101 and allow fluid communication with the ballast water spaces 102. The water inlet pump 113 is configured to draw water from the ballast water spaces 102 and transfer the water to the filtration system 114 to produce filtered water. The inlet channel 104$a$ is configured to receive filtered water from the filtration system 114, which is to be distributed to the various tanks 103 via the inlet channel 104$a$ and water supply pipes 104$b$ as clean or fish production water. The discharge channel 105$b$ is configured to receive waste water from the tanks 103, which is to be discharged into at least one waste water storage tank 116 arranged at/on the hull 101. A water treatment system may be provided and configured to treat the waste water in the waste water storage tank 116 to produce treated water. The waste water storage tank 116 is fluidly coupled to ballast water spaces 102 to allow an overflow of the waste storage tank 116, e.g. treated water, enter the ballast water spaces 102 for subsequent use or circulation to the cultivated tank 103. Accordingly, in this mode, water is taken from ballast water spaces onboard the apparatus 10 to provide clean or fish production water, and waste water may be treated before it is returned to the ballast water spaces such that the water circulation is contained within the aquaculture production apparatus 10.

Referring to FIG. 2B, the aquaculture production apparatus 10 may include a foreship compartment 10a, a midship compartment 10b and an aftship compartment 10c. The foreship compartment may include water inlet pumps 113, pump room, filtration system comprising of drum filters 114a, ultraviolet or other type of sterilizer 114b, standby emergency liquid oxygen cylinder with oxygen generating set 133 and inflatable oxygen storage tanks 108, weather vaning system, or a combination thereof. The midship compartment may include the aforementioned cultivation tanks 103, top and passageway 106, water inlet channel, including water supply pipes, discharge channel, discharge pipes, utilities pipelines and valves, solar panel roof, enhanced production, or a combination thereof. The aftship compartment may include feed storage, automated feeding system, power generation equipment, switchboard room, control room, office, laboratory, crew accommodation, fish discharge point, waste collection, water treatment, or a combination thereof. Accordingly, equipment required for aquaculture cultivation may be self-contained within each apparatus 10.

Embodiment of FIGS. 1B and 1C shows a disc-shaped aquaculture production apparatus 10, e.g. hull having a disc-shaped plan profile. The sloping bottom of the hull 101 is provided with multiple finned blades 101e which are configured to cause the apparatus 10 to rotate due to current flow in a body of water external of the hull 101. This rotational motion may be used to generate electrical energy for use by the aquaculture production apparatus 10 and its components thereof. Cold water such as from the water body external of the hull 101 may be transferred through cold water inlet point 141 into ballast water spaces 102, to cool or lower the temperature of water in the cultivation tanks 103. In so doing, tropical weather regions may be able to produce farmed salmon. The same cold water may be transfer via air coolers 141a into the apparatus' 10 upper surface and space under the roof to cool down the ambient temperature of this space as well. The cold water may be waste cold water from nearby LNG (Liquefied Natural Gas) plant, e.g. the Lift-Dock Small Scale LNG and Lift-Dock-Storage Regasification Terminal (SRT). In this embodiment, the apparatus 10 may include a single large cultivation of fish tank 103.

Figure 2D:
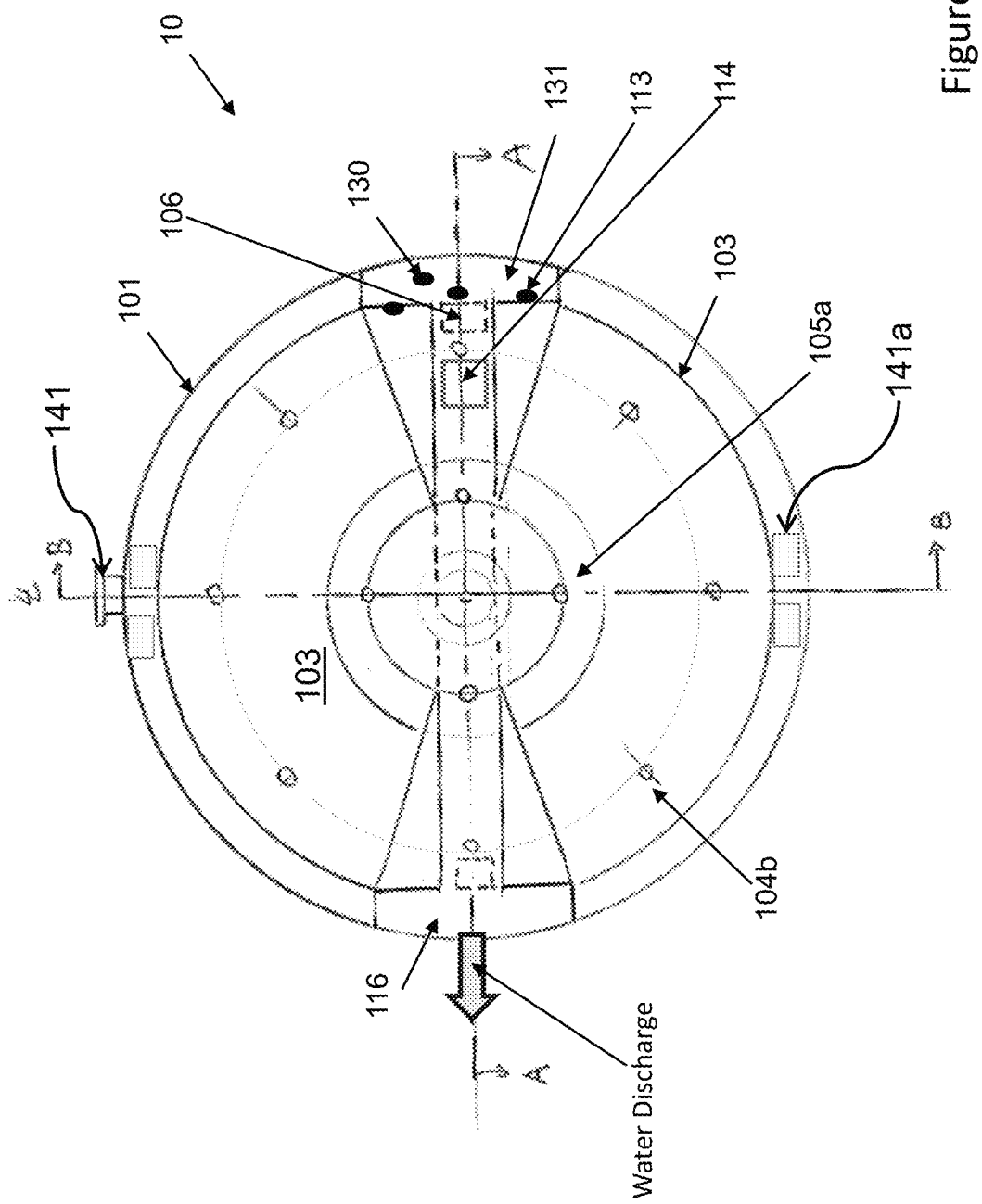
FIG. 2D is a plan view of a circular shaped aquaculture production apparatus.

Embodiment of FIGS. 2D to 2F shows a bowl-shaped aquaculture production apparatus 10 which may be deployed for all weather by way of its design and having a flat bottom portion 101a with dead-ballast. The dead-ballast may include pig-iron with special concrete cement and/or high density barite of more than 4200 kg/m³ as permanent dead ballast to further enhance the stability of the bowl-shaped apparatus 10 in harsh water condition. This apparatus 10 may be configured to receive waste cold water from nearby onshore or offshore LNG (Liquefied Natural Gas) Regasification Plant to reuse the cold energy from vaporising the liquid LNG to gas. This will protect the eco-system of the site and at the same time recover this cold energy for better utilisation of energy and resources management. Cooling coils are arranged in the cultivation tanks 103 to cool the water in the tanks and at the same time the cleaned ballast water tank 102 can be used as a large cold transfer medium. In this embodiment, the apparatus 10 may include a single large cultivation or fish tank 103.

FIG. 2E shows a side cross-sectional view of the bowl-shaped aquaculture production apparatus taken along line A-A of FIG. 2D where water supply pipes 104b for supplying water from the inlet channel 104a are lowered into the tanks 103 at various locations to create a cyclonic motion or circular water current such that waste settling at a bottom section of the tank would be discharged through tank discharge pipes 105a and waste at a top section of the tank would discharged into the discharge channel 105b by atmospheric/gravity. This siphonic effect due to gravity is possible due to a height differential of the water level in the fish tank being higher than the water level of the water body external of the hull 101 in this and other embodiments. This way, freeboard of the apparatus 10 would be kept low to reduce the energy required to pump water external of the hull 101 into the inlet channel 104a and the siphonic discharge of waste does not require any electrical pump and hence no energy is required and thereby reducing energy and electrical power usage in the operation of the apparatus 10. Accommodation and/or laboratory 130 may be provided. The fish food storage and automatic feeding system 131, oxygen generator with its storage tanks 133, the auxiliary engines and/or control room 132 may be provided on board the apparatus 10. Both ends of the passage or duct tunnel 106 may lead to both ends of the apparatus 10 and be provided with water-tight hatch cover. Filtration system comprising of drum filter 114a, with sterilizer 114b and biological filters 114c may be provided.

Embodiment of FIG. 2G shows a side cross-sectional view of a bowl-shaped aquaculture production apparatus 10 which is similar to FIGS. 2D to 2F. Depending on site condition, the apparatus 10 includes a ballast space 142a which may include a ballastible tank or dead ballast which provides stability in harsh water conditions, or a rotating turret 142b. The ballast 142a or rotating turret 142b may provide a station keeping apparatus 20 to the aquaculture production apparatus 10. However, a watertight roof 111c, e.g. dome shape, which may be made of heavy duty waterproof composite fibre, may be provided and configured to provide a water tight connection with the hull 101 of the apparatus 10 such that the entire apparatus 10 may be partially submerged underwater in the event of adverse weather condition with strong winds and high waves, yet maintaining its full stability, without causing damage to the equipment onboard or disruption to farming operation on the apparatus 10. The watertight roof 111c may include watertight hatch openings and/or doors which are configured to allow fluid communication therethrough in an open position and to block fluid communication therethrough in a closed position to provide watertight connection with the hull 101.

Referring to FIGS. 1A and 1H, multiple units of aquaculture production apparatuses 10 are coupled to a station keeping apparatus 20 and a custodian transfer apparatus 30 to provide a production farm. In some embodiments, a central waste collector pipe 11 is provided and traverses the lengths and/or beams (widths) of multiple aquaculture production apparatuses. The central waste collector pipe 11 may be fluidly coupled to discharge channels 105b of various aquaculture production apparatuses 10 to receive waste water therefrom. The central waste collector pipe 11 includes a first end portion and a second end portion which are configured to alternatively elevate relative to each other, in accordance with tide flow direction, to discharge waste from the waste collector pipe by gravity into the body of water external of the hulls. Elevation of either end portion may be performed by hydraulic means. Water treatment apparatus may be provided and configured to treat the waste in the waste collector pipe before the waste water is discharged into the open sea.

Referring to FIGS. 1A and 1H, at least some of the aquaculture production apparatuses 10 are coupled, e.g. mechanically coupled, to a station keeping apparatus 20, which may include weather vaning system to maintain the apparatuses 10 within a desired area or in desired positions and also to ensure that there is no cross flow of the fish waste to the fish production water suction point, e.g. water inlet of aquaculture production apparatus 10.

In one embodiment, e.g. for benign water conditions, the station keeping apparatus 20 may be a mooring buoy which is moored to the bottom of the water body, e.g. sea bed.

Figure 8A:
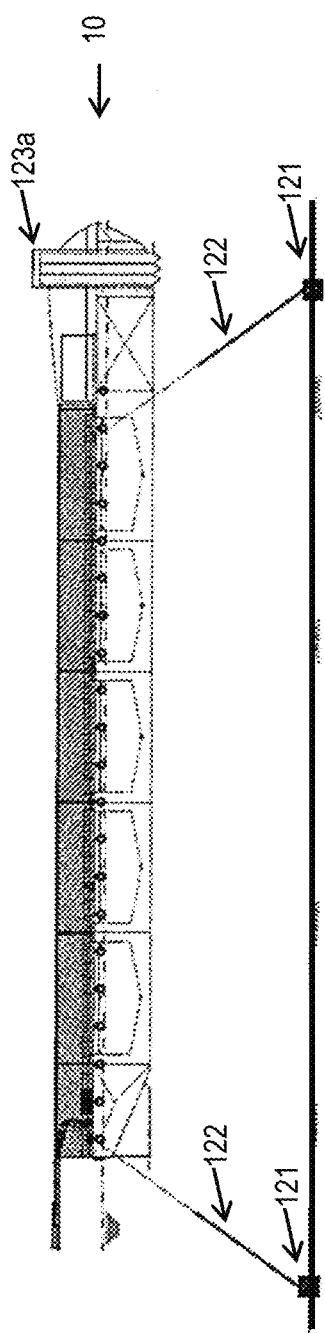
FIG. 8A is a side elevational view of a mooring arrangement of aquaculture production apparatuses.
Figure 8B:
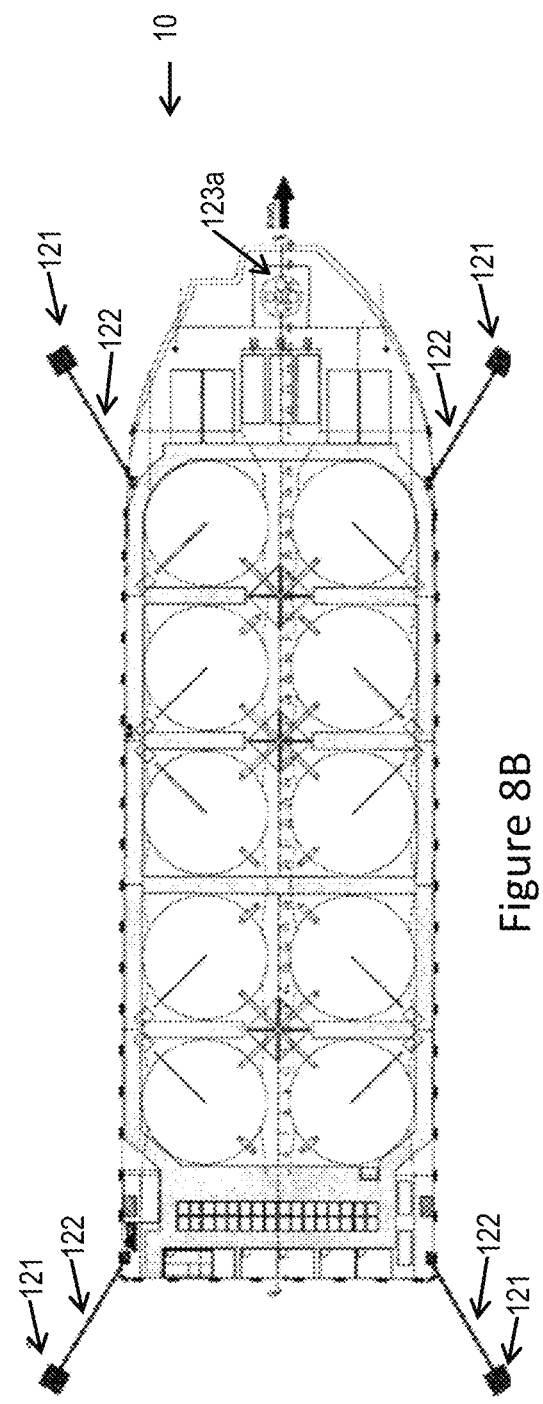
FIG. 8B is a plan view of the mooring arrangement of FIG. 8A.

In one embodiment (FIGS. 8A and 8B), e.g. for benign water conditions, the station keeping apparatus 20 may include gravity-based foundations 121, e.g. concrete anchors or bases, secured to the bottom of the water body and four mooring lines 122 coupling the apparatus 10 to the gravity-based foundations.

Figure 8D:
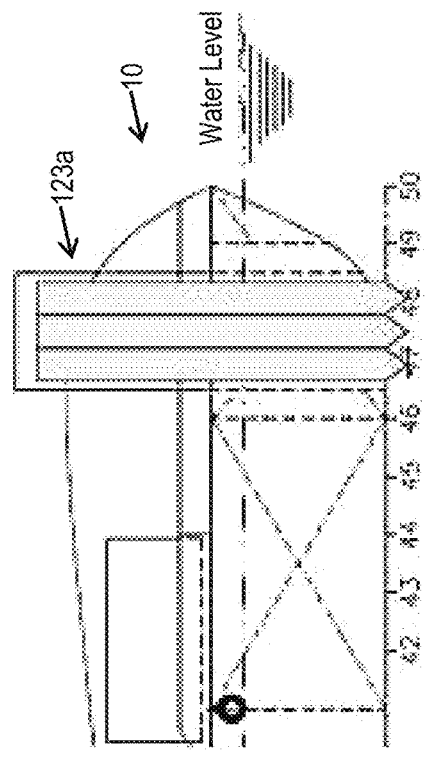
FIG. 8D is a side elevation view of multi-spud pipe single column provided at an aquaculture production apparatus.
Figure 8C:
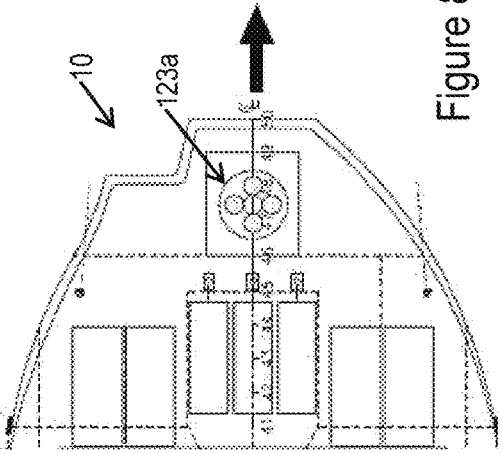
FIG. 8C is a plan view of multi-spud pipes single column provided at the aquaculture production apparatus of FIG. 8A.

In one embodiment (FIGS. 8C and 8D), e.g. for benign water conditions, the station keeping apparatus 20 may be provided at the apparatus 10 and include a set of anchor or spud legs 123a, e.g. columns, pipes, which are configured to be lowered and secured to the bottom of the water body. This embodiment would allow the apparatus 10 to weather vane or pivot about the anchor or spud legs 123a.

Figure 8E:
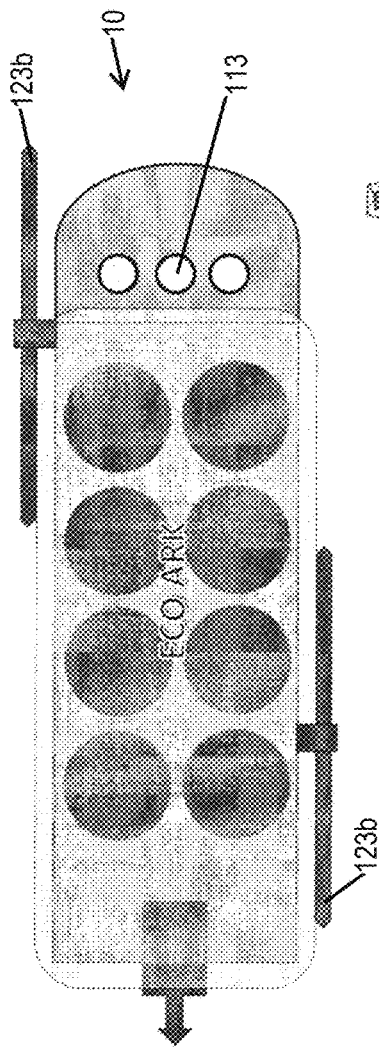
FIG. 8E is a plan view of single or double side columnar spud pipes provided at the aquaculture production apparatus of FIG. 8A.
Figure 8F:
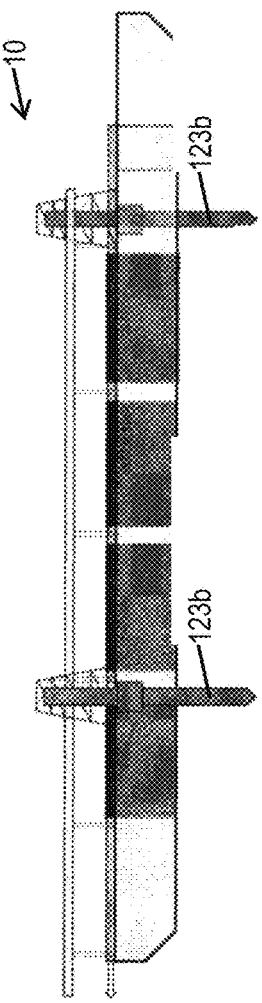
FIG. 8F is a side elevation view of single or double side columnar spud pipes provided at the aquaculture production apparatus of FIG. 8E.

In one embodiment (FIGS. 8E and 8F), e.g. for benign water conditions, the station keeping apparatus 20 may be provided at the apparatus 10 and include two sets of anchor or spud legs 123b, e.g. columns, pipes, which may be movable between a horizontal (inoperative) position (see FIG. 8E) and a vertical (operative) position (FIG. 8F). The anchor or spud legs 123b are configured to be rotated from the horizontal position to a vertical position, and lowered and secured to the bottom of the water body. The two sets of anchor or spud legs 123b may be provided on opposed sides and/or end portions of the apparatus 10.

In one embodiment (FIG. 8G), e.g. for benign water conditions, the station keeping apparatus 20 may be provided at the apparatus 10 and may include gravity-based foundations 121, e.g. concrete anchors or bases, secured to the bottom of the water body, two mooring lines 122 coupling the apparatus 10 to the gravity-based foundations, and a set of anchor or spud legs 123c. The two mooring lines 122 may be coupled to two coupling points on the apparatus 10 and configured to restrict movement of the apparatus 10 within an area defined by the length of the mooring lines 122. The coupling points may be arranged on opposed sides and/or end portions of the apparatus 10. The anchor or spud legs 123c may be arranged at a portion of the apparatus 10 which is distal from the coupling points. The anchor or spud legs are configured to be lowered and secured to the bottom of the water body to allow the apparatus 10 weathervane or pivot about the legs. If tide flow is in direction A, the apparatus 10 is allowed take the position of A' in which a first line is taut and a second line is slack. If tide flow is in direction B, the apparatus 10 is allowed take the position of B' in which the first line becomes slack and the second line becomes taut. The angle of swing may be 60 degrees. The change of position allows the apparatus 10 to take suction of water upstream of the tide flow for clean water supply to the inlet channel and cultivation tanks.

In another embodiment (see FIGS. 8H and 8I), e.g. for harsh water condition, the station keeping apparatus 20 may be a gravity-based mooring arrangement which includes anchor or spud legs 124, e.g. columns, pipes, attached to a gravity-based foundation 125, e.g. matted base attached to the legs 124 and/or spud can attach to each leg 124. The gravity-based foundation 125 is configured to be lowered, e.g. by ballasting, to the bottom of the body of water, e.g. sea bed, and may be secured thereto to secure the bottom portions of the legs. The aquaculture production apparatuses 10 may be mechanically coupled to the legs 124 such as by lines, e.g. mooring lines 122. Cross-braces or cables 126 may be arranged over the apparatuses 10 and couple the top portions of the legs to provide further stability to the mooring arrangement.

Referring to FIG. 1A, a custodian transfer apparatus 30 is provided and configured to receive cultivated aquatic animals from various aquaculture production apparatuses 10 or farms, and transfer the aquatic animals through a chute 32 to an amalgamated facility 40. The custodian transfer apparatus 30 may be further configured to sort the aquatic animals and perform accounting, e.g. weighing and/or counting, of the aquatic animals before they enter the chute 32 and after they exit from the chute 32.

The custodian transfer apparatus 30 includes at least one custodian chamber 31, a custodian transfer chute 32 and at least one custodian transfer pump. The custodian chamber 31 is configured to receive live aquatic animals from at least one aquaculture production apparatus 10. As such, the custodian chamber 31 may include at least one inlet which is fluidly coupled to an aquaculture transfer pump 107b, and an outlet which is fluidly coupled to the chute 32.

The custodian transfer apparatus 30, e.g. custodian chamber 31, may include a first sorting apparatus, e.g. fish sorter, which is configured to detect sizes and/or specie of the aquatic animals and, based on the detected sizes and/or specie, allow entry of qualified aquatic animals which meet predetermined requirement(s) to enter the chute and/or block unwanted aquatic animals which fall within one or more predetermined unwanted sizes and/or specie, e.g. pregnant fish, under-sized fish, from entering the chute 32. The first sorting apparatus may include a bypass gate configured to direct the unwanted aquatic animals to the originating cultivation tank 103 or other designated tanks.

The custodian transfer apparatus 30, e.g. custodian chamber 31, may include a first counter apparatus which is configured to count the number of cultivated aquatic animals, e.g. sorted aquatic animals, before they enter the chute 32. It is to be appreciated that the first counter apparatus may be provided by or integrated with the first sorting apparatus.

In some embodiments, the custodian transfer apparatus 30 is provided as part of a vessel, e.g. barge, which may be mechanically coupled or moored to the station keeping apparatus 20. The barge may include storage space, e.g. for storing fish meal, energy generation plant, e.g. renewable and waste-to-energy plant, water treatment plant, and waste control/treatment.

Referring to FIGS. 1A and 1H, the custodian transfer apparatus 30 is configured to transfer live aquatic animals therefrom to an amalgamated facility 40, which is separated from the custodian transfer apparatus 30 and aquaculture production apparatuses 10 by a body of water, through a chute 32. The chute 32 may include a flexible hose or a rigid pipe or a combination thereof. In some embodiments, the chute 32 includes at least one portion thereof which may be floating on water or submerged or arranged at the water bed/sea bed or combinations thereof.

The chute 32 includes an inlet which is fluidly coupled to the outlet of the custodian transfer apparatus 30, e.g. custodian chamber 31, and an outlet which is located at or near the amalgamated facility 40. The custodian transfer pump(s) may be arranged at the inlet and/or outlet of the chute and configured to draw a flow of water through the chute 32 such that the aquatic animals are transported towards the outlet of the chute by the flow of water, e.g. induced water current.

The custodian transfer apparatus 30 includes a fish or aquatic animal lift 34 arranged at the outlet of the chute and configured to vertically lift the aquatic animals leaving the chute to the amalgamated facility 40. Examples of a fish or aquatic animal lift include spiral shaped multi-level conveyor belt, Archimedes screw or screw pump. The fish lift 34 includes an inlet fluidly coupled to the outlet of the chute 32, and an outlet for discharging the aquatic animals.

The custodian transfer apparatus 30 includes a second counter apparatus arranged at the outlet of the chute and configured to count a number of the aquatic animals leaving the chute.

Figure 9:
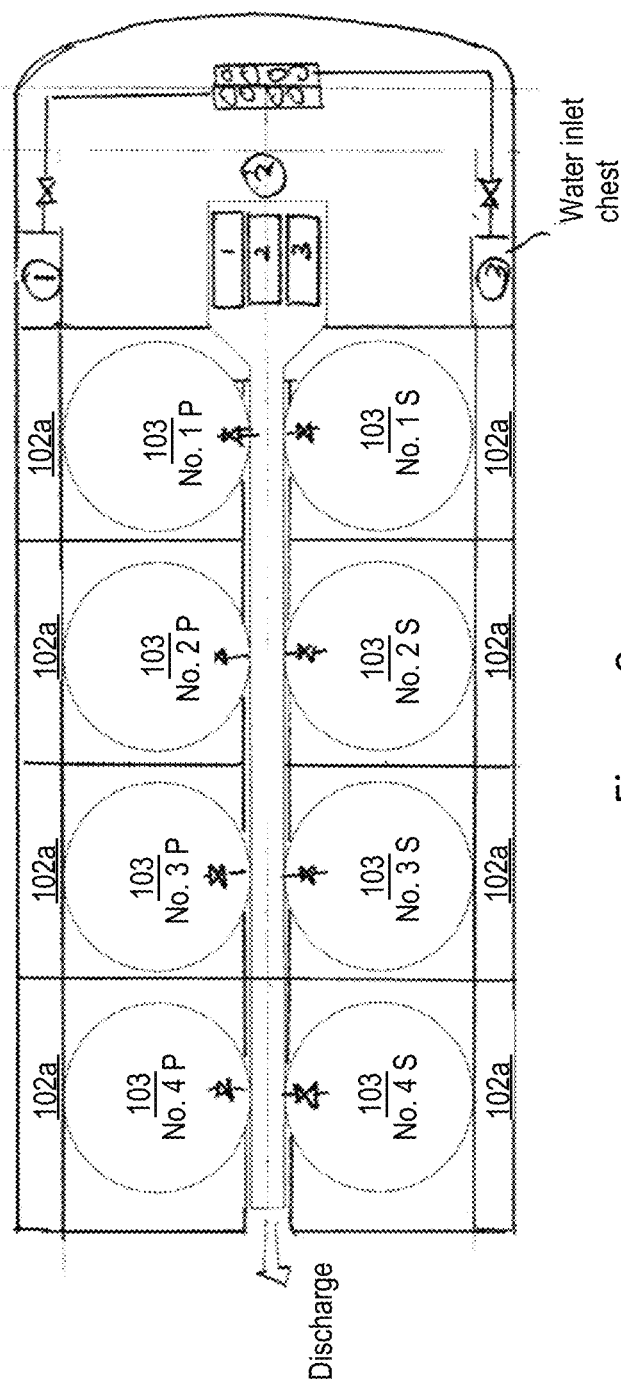
FIG. 9 is a plan view of an aquaculture production apparatus wherein the inlet channel is configured to balance the water flow into every cultivation tank and is inclined.

Referring to FIGS. 1 and 9, an offshore amalgamated facility 40 includes an inbound/import facility, a hatchery facility, a sorting facility, an aquaculture processing facility, an export facility, an agricultural facility, an infrastructure facility, an accommodation facility, and at least two berthing spaces.

The inbound/import facility may include an arrival chamber for receiving aquatic animals exiting from the chute 32 and/or Archimedes screw. The inbound/import facility may be further configured to receive aquatic animals from other than the aquaculture production apparatus 10, e.g. from wild harvest.

The hatchery facility may include nursery and/or research and development facilities.

The sorting facility may include a second sorting apparatus, e.g. fish sorter, shaker apparatus, to sort aquatic animals into different weight, sizes and/or specie. For example, a shaker apparatus produce vibrations which sort aquatic animals by their weight. For example, pregnant female fish may be detected by their weight and/or size and transferred to a hatchery. The sorting facility may include an optical camera for ascertaining marketability of aquatic animals based on its attributes. For example, the optical camera detects species and/or colour of fish, and based on the detected species and/or colour, the fish is transferred to separate chambers.

The aquaculture processing facility may include a factory for processing the aquatic animals into aquaculture products, e.g. filleting and freezing of fresh fish for export and onward distribution for human consumption, and recycling wastes from aquaculture processing into aquaculture by-products, e.g. fertilisers, fish meal.

The export facility is configured to allow loading of aquaculture products and/or by-products onto live fish carriers or other transport vessels. Examples include a berth for sea-going vessels, e.g. trawlers, cargo ships, and a helipad for helicopters.

The vertical agricultural and/or agroculture facility may include farms which may utilize by-products—fertilizer from fish faeces and fish emulsifier produced from the aquaculture processing facility and/or aquaponics.

The infrastructure facility includes housing structures for establishment, offices for local custom department, special equipment & machinery, research and development & hatchery, etc.

The accommodation facility includes housing structures for operation staff, visitors, and hotels for tourists, etc.

Figure 16:
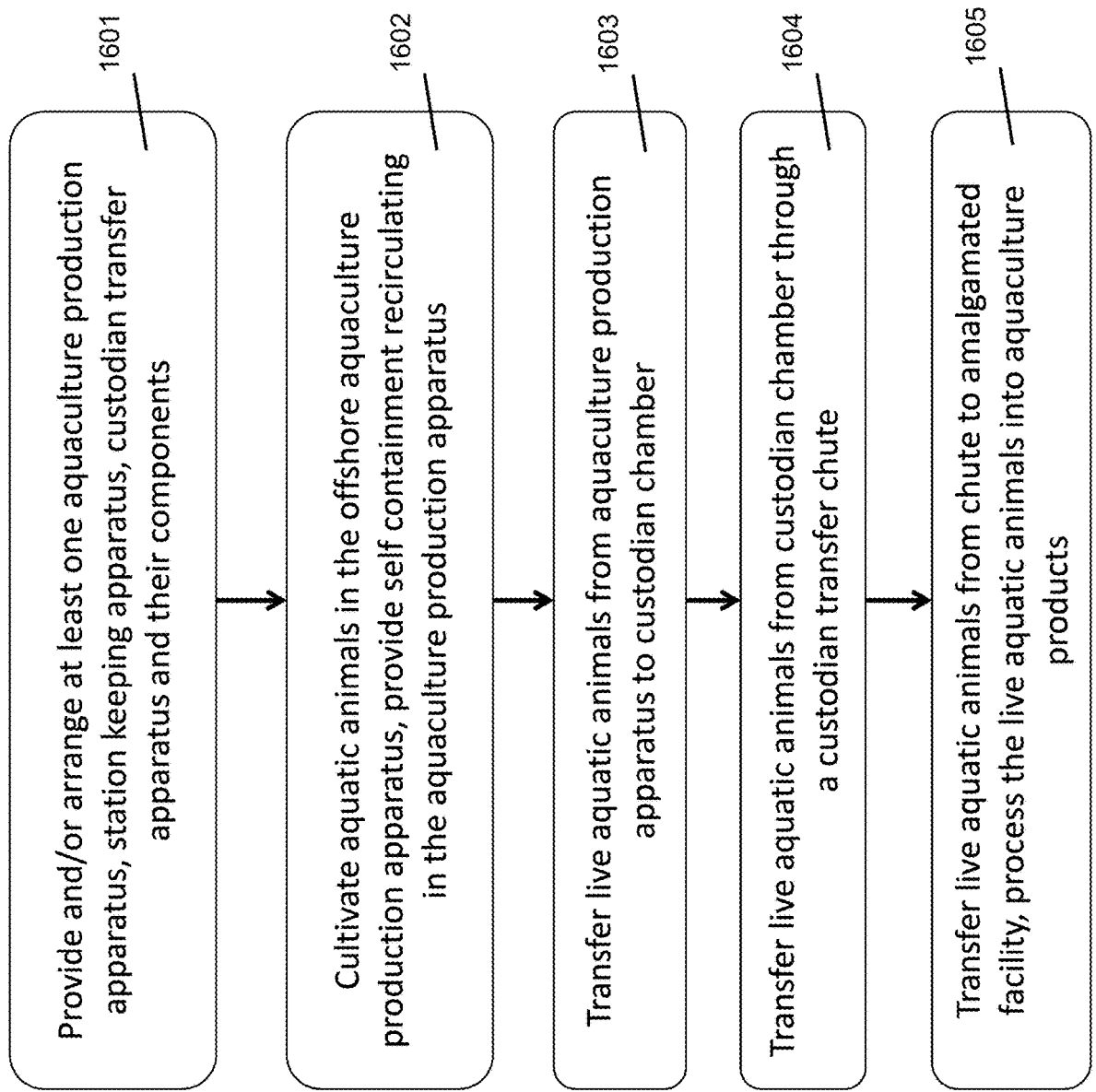
FIG. 16 is a flow chart of an aquaculture production and transfer method.

An aquaculture production and transfer method is provided according to one embodiment of the invention, and described with reference to FIG. 16.

In block 1601, at least one aquaculture production apparatus 10, station keeping apparatus 20, custodian transfer apparatus 30 and their components are provided and/or arranged as described in the foregoing description.

In block 1602, aquatic animals are cultivated in the aquaculture production apparatus which is arranged in a body of water.

This cultivation step may include providing a water production and/or circulation system in each aquaculture production apparatus 10. The water production and/or circulation system allows clean or fish production water, which is to be channeled to cultivation tanks 103, to be alternatively received from the body of water or the ballast water spaces. In a full recirculation mode, water to be channeled to cultivation tanks 103 is transferred from ballast water space 102 via the inlet channel 104*a* while water discharged from the cultivation tanks 103 is transferred, via the discharge channel 105*b*, to a waste water storage tank 116 arranged at/on the hull. Water in the waste water storage tank 116 is treated to produce treated water. The treated water is transferred to the ballast water spaces 102 for subsequent use as clean or fish production water.

This cultivation step includes supplying the cultivation tanks with water at a flow rate similar to discharging the cultivation tanks of water.

This cultivation step may further include discharging water from the cultivation tanks to a discharge channel, by siphonic drainage, through the plurality of tank discharge pipes which are fluidly coupled between the cultivation tanks and the discharge channel; and discharging water from the cultivation tanks to the discharge channel by an overflow from the cultivation tanks.

In block 1603, aquatic animals are transferred from the floatable aquaculture production apparatus through one of the tank discharge pipes to a custodian transfer chamber.

In block 1604, the aquatic animals are transported through an inlet and an outlet of the chute by drawing a flow of water through the chute, wherein the inlet of the chute is fluidly coupled to the custodian transfer chamber.

In block 1605, the aquatic animals are vertically lifted from the outlet of the chute onto an amalgamated facility. At the amalgamated facility 40, e.g. arrival chamber, the live aquatic animals may be accounted, e.g. weighed, counted, and/or sorted, e.g. by size, weight, species. The aquatic animals may be processed in an aquaculture processing facility into aquaculture products before they are exported from the export facility to wholesalers, retailers and/or consumers. Unwanted aquatic animals or parts thereof may be processed into by-products and utilized as fertilizers for a vertical agriculture facility on the amalgamated facility 40.

Embodiments of the invention provide several advantages including but not limited to the following:

- The tilted down E-shape of the hull and use of void spaces or void tanks in the hull provide high buoyancy such that when the hull is in operative position in a body of water and loaded with water in the cultivation tank, the aquaculture production apparatus is allowed to remain semi-submerged or mostly submerged in the body of water to achieve low freeboard while the water level in the cultivation tank is higher than water level in the body of water (see FIG. 1C). This achieves low freeboard which is advantageous in reducing energy consumption as water is drawn e.g. by inlet pump, from the water body to be used in the cultivation tanks.
- Use of closed containment tanks obviates the use of cultivation nets or cages which would expose aquatic animals to open sea water and the need for net inspection, replacement, cleaning and maintenance associated with use of nets. Use of closed containment tanks eliminates direct exposure of aquatic animals therein to sea water, where there are risks of cross-infection and cross-contamination, predator birds resting on the HDPE (High-density polyethylene) of the net-cage and droppings to the sea, transferring bacteria and diseases, risk of fish escape, and the need for aquatic animals to resist potential strong sea water current. Use of closed containment tanks also eliminates inter-spread of diseases between aquatic animals in different tanks. Use of closed containment tanks allows higher stock density than open aquaculture net-cage farming, better feed utilization less fish food wastage and therefore results in lower cost and higher production yield and better productivity over the same sea acreage used.

Each farm or aquaculture production apparatus is provided with ballast water space or water storage tanks for storing water for use in the cultivation tanks. In the eventuality of emergency due to the unfortunate event of pollution, e.g. due to maritime accident, or algae boom, water from the ballast water space may be used to supply clean water to the cultivation tanks, waste water from cultivation tanks may be stored in a waste water storage tank and treated before transferring the treated water to the ballast water space to be subsequently used as clean or fish production water. In this recirculation mode, the biological filtration system may be activated as well, and the water circulation may be contained within the aquaculture production apparatus.

Siphonic discharge or drainage, by gravity, of the waste from the top and bottom of cultivation tanks, this eliminates the need for electrical power consumption for waste and/or water discharge. This gravity siphonic discharge may be continuous.

Each farm or off-shore sea water and/or lake and river fresh water aquaculture production apparatus is mobile, i.e. can be moved from site to site with ease as compared to open sea aquaculture which uses nets or cages.

Use of multiple offshore production apparatus provides modularity and scalability, such that aquaculture cultivation capacity can be added or reduced, or towed or transported away for maintenance or repair, without affecting the operation of the rest of the farms or offshore production apparatuses.

Use of the custodian transfer apparatus, including chute, allows the transfer of live aquatic animals to an aquaculture processing facility without physical handling of the live aquatic animals or requiring containers for holding the live aquatic animals. The custodian transfer apparatus allows the aquatic animals to be weighed and/or sorted before they enter the chute. The chute allows transfer of live aquatic animals in aquatic conditions, e.g. in moving water, through the chute. Accordingly, the invention provides a farm-to-factory for process, in which live cultivated aquatic animals are pumped from a cultivation tank to a custodian transfer apparatus/chamber where they may be accounted and/or sorted and then transferred through a chute, in aquatic or natural habitat condition, to an aquaculture processing facility in a live state. As such, there is no physical or human handling of aquatic animals during this farm-to-factory process. Furthermore, freshness, live condition and welfare of aquatic animals are preserved up to slaughter or arrival of the aquatic animals at the aquaculture processing facility without having to apply existing live fish handling practices, e.g. regulate metabolic rates of the aquatic animals, regulate temperature or oxygen level in transport containers holding the aquatic animals.

Use of an amalgamated facility allows both processing of the aquatic animals into aquaculture products and/or by-products and direct shipping of these products from the amalgamated facility. The amalgamated facility also provides a point of sales and/or importation of wild harvest for processing.

On the economics and environmental aspects, as compared to existing aquaculture farming methods, the invention increases food security and sustainability, uses small sea-acreage but allows high density cultivation, increases productivity yield, increases profitability by lowering overall capital expenditures (CAPEX) costs and overall operating expenses (OPEX) cost.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary.

The invention claimed is:

1. A floatable closed containment aquaculture production apparatus comprising:
    a hull having a bottom portion, opposed outer side portions extending from the bottom portion, and a center portion arranged between the outer side portions and extending from the bottom portion to define at least one recess between the center portion and the outer side portions, wherein at least the bottom portion and the outer side portions comprise one or more ballast water spaces; and
    at least one closed containment aquaculture cultivation tank arranged in the at least one recess,
    wherein the hull comprises void spaces configured to allow the hull, together with the at least one closed containment aquaculture cultivation tank, remain semi-submerged in water when the hull is arranged in a body of water, and
    wherein the one or more ballast water spaces are arranged into a plurality of compartments along a length or a circumference of the hull, wherein each compartment is configured to be ballasted in response to a discharge, from an adjacent closed containment aquaculture cultivation tank of the at least one closed containment aquaculture cultivation tank, of aquatic animals and water to allow the hull to maintain equilibrium in the body of water.

2. The apparatus of claim 1, wherein the at least one closed containment aquaculture cultivation tank is abuttedly arranged between the center portion and the outer side portions to provide at least one transverse bulkhead to the hull.

3. The apparatus of claim 1, wherein the center portion is positioned at the center of the hull and includes a lengthwise dimension which substantially extends along the length or a diameter of the hull.

4. The apparatus of claim 1, wherein the center portion is provided with a through passage or a dry caisson.

5. The apparatus of claim 4, wherein the through passage or the dry caisson is arranged between opposed inner side portions, wherein one of the opposed inner side portions, one of the outer side portions, and a part of the bottom portion form a cross-sectional profile having two U-shapes, two W-shapes, or two V-shapes.

6. The apparatus of claim 1, wherein a depth of the hull, defined by the outer side portions and the bottom portion, is at least 90 percent submerged in water when the hull is arranged in the body of water.

7. The apparatus of claim 1, wherein the hull includes a top plan profile selected from the group consisting of a circle, a square, a rectangle, a hexagon, an octagon, and a hexadecagon.

8. The apparatus of claim 1, wherein the hull includes a top plan profile and a bottom plan profile, wherein the top plan profile is larger than the bottom plan profile.

9. The apparatus of claim 1, further comprising:
an inlet channel fluidly coupled to:
a water source; and
at least one water supply pipe fluidly coupled between the inlet channel and the at least one closed containment aquaculture cultivation tank; and
a plurality of tank discharge pipes fluidly coupled to:
the at least one closed containment aquaculture cultivation tank, and
a discharge channel fluidly coupled between the tank discharge pipes and a discharge destination,
wherein the inlet channel is arranged over the discharge channel, and wherein the discharge channel is arranged over the center portion of the hull.

10. The apparatus of claim 9, wherein the tank discharge pipes are fluidly coupled to a bottom section of the at least one closed containment aquaculture cultivation tank, wherein the tank discharge pipes are configured to discharge water from the tank to the discharge channel via gravity siphonic drainage, and wherein discharge channel is arranged proximate to a top section of the at least one closed containment aquaculture cultivation tank to receive an overflow from therefrom.

11. The apparatus of claim 10, wherein the bottom section of the at least one closed containment aquaculture cultivation tank is tapered.

12. The apparatus of claim 9, wherein the tank discharge pipes and the water supply pipe are respectively configured to discharge water from the at least one closed containment aquaculture cultivation tank and supply water to the at least one closed containment aquaculture cultivation tank at a similar flow rate.

13. The apparatus of claim 9, wherein each water supply pipe includes spaced openings configured to discharge water into the at least one closed containment aquaculture cultivation tank to produce a circular water current therein.

14. The apparatus of claim 9, wherein the water source includes:
the one or more ballast water spaces, and
water from the body of water external to the hull, and
wherein the apparatus further comprises:
at least one sensor configured to detect an adverse condition in the body of water external to the hull; and
an inlet pump configured to draw water exclusively from the one or more ballast water spaces when the adverse condition is detected.

15. The apparatus of claim 14, wherein the discharge destination includes at least one waste water storage tank arranged at the hull, wherein the at least one waste water storage tank is configured to receive water from the discharge channel when the adverse condition is detected.

16. The apparatus of claim 15, further comprising:
a water treatment system configured to treat water in the waste water storage tank, wherein the waste water storage tank is fluidly coupled to the one or more ballast water spaces to allow water treated by the water treatment system enter the one or more ballast water spaces.

17. The apparatus of claim 9, wherein the inlet channel and the discharge channel are arranged at an incline between an assigned forward section or bow of the hull and an assigned rear section or stern of the hull.

18. The apparatus of claim 1, further comprising:
a tank support structure arranged against the center portion and one of the outer side portions; and
an additional cultivation tank arranged on the tank support structure and over the at least one closed containment aquaculture cultivation tank.

19. The apparatus of claim 1, further comprising:
a hydrogen converter; and
a plurality of solar panels arranged over the at least one closed containment aquaculture cultivation tank and coupled to the hydrogen converter, wherein the solar panels are configured to supply electrical energy to the hydrogen converter, and wherein the hydrogen converter is configured to convert sea water into a hydrogen fuel and an oxygen gas, and wherein the oxygen gas is circulated to the at least one closed containment aquaculture cultivation tank.

20. The apparatus of claim 1, further comprising:
a watertight roof configured to provide a watertight connection with the hull to allow partial submersibility of the apparatus underwater in adverse weather.

21. An aquaculture production and transfer system comprising:
a floatable closed containment aquaculture production apparatus comprising:
a hull comprising a bottom portion,
opposed outer side portions extending from the bottom portion, and
a center portion arranged between the outer side portions and extending from the bottom portion to define at least one recess between the center portion and the outer side portions,
wherein at least the bottom portion and the outer side portions include one or more ballast water spaces therein, wherein the hull comprises void spaces which allow the hull, together with at least one cultivation tank, to remain semi-submerged in water, and
wherein the one or more ballast water spaces comprises a plurality of compartments configured to be ballasted in response to a discharge of aquatic animals and water from an adjacent cultivation tank; and
at least one closed containment aquaculture cultivation tank arranged in the at least one recess;
a station keeping apparatus coupled to the floatable closed containment aquaculture production apparatus; and
a custodian transfer apparatus comprising:
a custodian chamber,
a chute having an inlet fluidly coupled to the custodian chamber and an outlet, and
at least one pump arranged at the chute,
wherein the custodian chamber is configured to be fluidly coupled to at least one tank discharge pipe to receive the aquatic animals, wherein the at least one pump is configured to draw a flow of water through the chute such that the aquatic animals are transported towards the outlet of the chute by the flow of water.

22. The aquaculture production and transfer system of claim 21, wherein at least a portion of the chute is floating on a body of water.

23. The aquaculture production and transfer system of claim 21, wherein at least a portion of the chute is submerged.

24. The aquaculture production and transfer system of claim 21, wherein the custodian transfer apparatus comprises a sorting apparatus configured to detect sizes of the aquatic animals and allow entry of the aquatic animals into the chute.

25. The aquaculture production and transfer system of claim 21, wherein the custodian transfer apparatus comprises a first counter apparatus configured to count a number of the aquatic animals entering the chute.

26. The aquaculture production and transfer system of claim 21, wherein the custodian transfer apparatus includes a fish lift arranged at the outlet of the chute and configured to vertically lift the aquatic animals leaving the chute.

27. The aquaculture production and transfer system of claim 21, wherein the custodian transfer apparatus includes a second counter apparatus arranged at the outlet of the chute and configured to count a number of the aquatic animals leaving the chute.

28. The aquaculture production and transfer system of claim 21, wherein the floatable closed containment aquaculture production apparatus includes a plurality of floatable aquaculture production apparatuses, the aquaculture production and transfer system further comprising:
a waste collector pipe fluidly coupled to a discharge channel of a first floatable aquaculture production apparatus and traversing at least some of the floatable aquaculture production apparatuses, wherein the waste collector pipe includes a first end portion and a second end portion which are configured to alternatively elevate relative to each other to discharge waste therefrom by gravity.

29. The aquaculture production and transfer system of claim 21, further comprising:
an amalgamated facility comprising at least one facility selected from one or more of: a research and development facility, a hatchery facility, at least two berthing spaces, a first import facility configured to receive the aquatic animals from the chute, a sorting facility configured to sort the aquatic animals by weight, size, and/or species, an aquaculture processing facility configured to process the aquatic animals, a second import facility configured to receive aquatic animals from external sources, and an export facility configured to allow loading of one or more of aquaculture products or byproducts onto transport vehicles, a farming facility, and an accommodation facility.

30. The aquaculture production and transfer system of claim 21, wherein the station keeping apparatus comprises:
a plurality of legs; and
a gravity-based foundation attached to the legs and secured to the bottom of a body of water, wherein the floatable closed containment aquaculture production apparatus is mechanically coupled to the plurality of legs.

31. The aquaculture production and transfer system of claim 21, wherein the station keeping apparatus comprises a plurality of mooring lines for coupling the hull to a plurality of gravity-based foundations and configured to restrict movement of the floatable closed containment aquaculture production apparatus within an area defined by the mooring lines; and
wherein the floatable closed containment aquaculture production apparatus comprises at least one anchor leg configured to be secured to the bottom of a body of water external of the hull and further configured to allow weather vaning of the floatable aquaculture production apparatus about the at least one anchor leg.

32. An aquaculture production and transfer method, the method comprising:
cultivating aquaculture in at least one floatable aquaculture production apparatus arranged in a body of water, wherein the at least one floatable aquaculture production apparatus comprises:
a hull comprising a bottom portion;
opposed outer side portions extending from the bottom portion; and
a center portion arranged between the outer side portions and extending from the bottom portion to define at least one recess between the center portion and the outer side portions;
wherein at least the bottom portion and the outer side portions include one or more ballast water spaces therein, wherein the hull comprises void spaces which allow the hull, together with at least one closed containment aquaculture cultivation tank, to remain semi-submerged in water; and
wherein the one or more ballast water spaces comprise a plurality of compartments configured to be ballasted in response to a discharge of aquatic animals and water from an adjacent cultivation tank;transferring aquatic animals from the at least one floatable aquaculture production apparatus through one of a plurality of tank discharge pipes to a custodian transfer chamber; and
transporting the aquatic animals through an inlet and an outlet of a chute by drawing a flow of water through the chute, wherein the inlet of the chute is fluidly coupled to the custodian transfer chamber.

33. The method of claim 32, further comprising:
vertically lifting the aquatic animals from the outlet of the chute to an amalgamated facility.

34. The method of claim 33, further comprising:
processing the aquatic animals into aquaculture products at the amalgamated facility and exporting the aquaculture products from the amalgamated facility.

35. The method of claim 32, further comprising:
discharging aquatic animals and water from the at least one closed containment aquaculture cultivation tank and, in response thereto, ballasting a compartment which is adjacent to the at least one closed containment aquaculture cultivation tank, wherein the compartment includes one or more ballast spaces.

36. The method of claim 32, further comprising:
discharging, via siphonic drainage and though the plurality of tank discharge pipes, water from the at least one closed containment aquaculture cultivation tank to a discharge channel, wherein the plurality of tank discharge pipes are fluidly coupled between the at least one closed containment aquaculture cultivation tank and the discharge channel; and
discharging water from the at least one closed containment aquaculture cultivation tank to the discharge channel by an overflow from the at least one closed containment aquaculture cultivation tank.

37. The method of claim 32, further comprising:
supplying the at least one closed containment aquaculture cultivation tank with water at a flow rate similar to discharging the at least one closed containment aquaculture cultivation tank of water.

38. The method of claim 32, wherein supplying the at least one closed containment aquaculture cultivation tank with water comprises receiving, by the at least one closed containment aquaculture cultivation tank, water from the body of water or water stored in the one or more ballast water spaces.

39. The method of claim 38, further comprising:
in response to receiving, by the at least one closed containment aquaculture cultivation tank, water stored in the one or more ballast water spaces, transferring water discharged from the at least one closed containment aquaculture cultivation tank to a waste water storage tank arranged at the hull;
treating water in the waste water storage tank to produce treated water; and
transferring the treated water to the ballast water space.

* * * * *